United States Patent
Matsuyama et al.

(10) Patent No.: US 8,651,650 B2
(45) Date of Patent: Feb. 18, 2014

(54) INKJET RECORDING INK, INKJET RECORDING INKSET, INK CARTRIDGE, INKJET RECORDING METHOD, AND RECORDED MATTER

(75) Inventors: Akihiko Matsuyama, Kanagawa (JP); Ichiroh Fujii, Kanagawa (JP); Yuuki Yokohama, Kanagawa (JP); Kiyofumi Nagai, Tokyo (JP); Akihiko Gotoh, Kanagawa (JP); Mariko Kojima, Tokyo (JP); Masaki Kudoh, Kanagawa (JP); Tomohiro Nakagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 297 days.

(21) Appl. No.: 13/126,776

(22) PCT Filed: Oct. 29, 2009

(86) PCT No.: PCT/JP2009/068939
§ 371 (c)(1),
(2), (4) Date: Apr. 29, 2011

(87) PCT Pub. No.: WO2010/050618
PCT Pub. Date: May 6, 2010

(65) Prior Publication Data
US 2011/0205288 A1 Aug. 25, 2011

(30) Foreign Application Priority Data

Oct. 30, 2008 (JP) ................................ 2008-280327
Jun. 16, 2009 (JP) ................................ 2009-143001

(51) Int. Cl.
*B41J 2/01* (2006.01)

(52) U.S. Cl.
USPC .......................................... 347/100; 347/95

(58) Field of Classification Search
USPC ......... 347/100, 95, 96, 88, 99, 101, 102, 105; 106/31.6, 31.13, 31.27; 523/160, 161
See application file for complete search history.

(56) References Cited

U.S. PATENT DOCUMENTS

| 5,814,685 | A | * | 9/1998 | Satake et al. ................ 347/100 |
| 7,919,544 | B2 | | 4/2011 | Matsuyama et al. |
| 2007/0197685 | A1 | * | 8/2007 | Aruga et al. ................. 523/160 |
| 2008/0036830 | A1 | | 2/2008 | Natori et al. |
| 2008/0070008 | A1 | | 3/2008 | Namba et al. |
| 2008/0092773 | A1 | | 4/2008 | Matsuyama |
| 2008/0248260 | A1 | * | 10/2008 | Kojima et al. ................ 347/100 |
| 2009/0035468 | A1 | | 2/2009 | Matsuyama et al. |
| 2009/0047431 | A1 | | 2/2009 | Hatada et al. |
| 2009/0098312 | A1 | | 4/2009 | Goto et al. |
| 2009/0176070 | A1 | | 7/2009 | Goto et al. |
| 2009/0186162 | A1 | | 7/2009 | Namba et al. |
| 2009/0239044 | A1 | | 9/2009 | Habashi et al. |
| 2009/0263632 | A1 | | 10/2009 | Kojima et al. |
| 2011/0216123 | A1 | | 9/2011 | Tamai et al. |
| 2011/0310166 | A1 | | 12/2011 | Namba et al. |
| 2012/0236066 | A1 | | 9/2012 | Tamai et al. |

FOREIGN PATENT DOCUMENTS

| CA | 1296466 C | 2/1992 |
| CN | 101040014 A | 9/2007 |
| CN | 101048469 A | 10/2007 |
| CN | 101117468 A | 2/2008 |
| CN | 101248146 A | 8/2008 |
| EP | 0 268 920 A1 | 6/1988 |
| JP | 2000 327968 | 11/2000 |
| JP | 2003 003102 | 1/2003 |
| JP | 2006 282986 | 10/2006 |
| JP | 2007 84807 | 4/2007 |
| JP | 2007 106997 | 4/2007 |
| JP | 2007 146135 | 6/2007 |
| JP | 3993022 | 8/2007 |
| JP | 2007 253616 | 10/2007 |
| JP | 2008 095089 | 4/2008 |
| WO | WO 2007/023987 A1 | 3/2007 |
| WO | WO 2007100121 A1 * | 9/2007 ................ B41J 2/01 |
| WO | 2011/026955 A1 | 3/2011 |

OTHER PUBLICATIONS

International Search Report issued Feb. 16, 2010 in PCT/JP09/068939 filed Oct. 29, 2009.

Combined Office Action and Search Report issued Mar. 15, 2013 in Chinese Application No. 200980143635.4 (With English Translation).
Extend European Search Report dated Nov. 5, 2013 issued in corresponding EP patent application No. 09823724.1.

\* cited by examiner

*Primary Examiner* — Manish S Shah
(74) *Attorney, Agent, or Firm* — Oblon, Spivak, McClelland, Maier & Neustadt, L.L.P.

(57) ABSTRACT

An inkjet recording ink containing a colorant, a surfactant A, a surfactant B, a water soluble organic solvent, and water, wherein the surfactant A is expressed by any one of Structural Formula (1) and Structural Formula (2), and the surfactant B is expressed by Structural Formula (3): in Structural Formula (1), R1 represents hydrogen, an alkyl group, or an acyl group; Rf represents —$CF_3$ or —$CF_2CF_3$; and m, n and p are natural numbers; in Structural Formula (2), M represents alkali metal, ammonium, phosphonium, or alkanolamine; Rf represents —$CF_3$ or —$CF_2CF_3$; and q is a natural number; in Structural Formula (3), $R^3$ and $R^4$ each represent hydrogen or an alkyl group; and r, s, t and u are natural numbers.

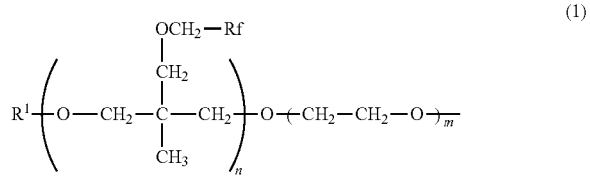

(1)

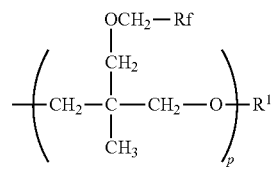

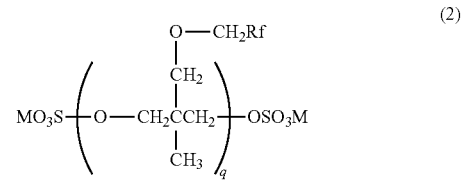

(2)

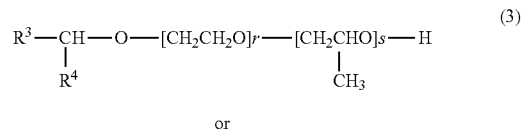

(3)

or

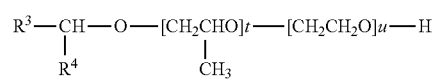

11 Claims, 3 Drawing Sheets

INKJET RECORDING INK, INKJET RECORDING INKSET, INK CARTRIDGE, INKJET RECORDING METHOD, AND RECORDED MATTER

CROSS-REFERENCE TO RELATED APPLICATIONS

This application is a National Stage of PCT/JP2009/068939 filed on Oct. 29, 2009. This application is based upon and claims the benefit of priority to Japanese Application No. 2008-280327 filed on Oct. 30, 2008, and to Japanese Application No. 2009-143001 filed on Jun. 16, 2009.

BACKGROUND OF THE INVENTION

1. Technical Field

The present invention relates to an inkjet recording ink which can satisfy both enhancement of image quality on plain paper and ejection stability of an inkjet printer, an inkjet recording inkset, an ink cartridge, an inkjet recording method and a recorded matter using the inkjet recording ink.

2. Background Art

In inkjet recording, enhancement of ink penetrating property has been attempted to improve saturation (color developing property) on plain paper. Decrease in surface tension of an ink is effective to enhance the penetrating property, and the ink contains a fluorine surfactant, a silicone surfactant or the like. However, the silicone surfactant is easily decomposed by heat, and a problem occurs in storage stability of an ink containing the silicone surfactant. On the other hand, the fluorine surfactant has high stability against heat, but has following problems: the fluorine surfactant is less compatible with a water soluble organic solvent, a resin component and the like, which are contained in an ink; and due to easiness in foaming, air bubbles easily occur in a nozzle pore in an inkjet head, causing ejection failure, and the like.

For example, Patent Literature 1 discloses use of a fluorine surfactant corresponding to a surfactant A expressed by Structural Formula (1) used in the present invention. In the case of Patent Literature 1, the fluorine surfactant foams less than other fluorine surfactants, but has poor ink storage stability. Additionally, an ink containing the fluorine surfactant easily attaches to a nozzle surface of an inkjet head, the details of which will be described below. Then, Patent Literature 1 discloses Examples in which the surfactant A and another fluorine surfactant are combined. As mentioned in Comparative Examples below, the combination of the fluorine surfactants does not achieve an effect of the present invention.

CITATION LIST

Patent Literature

PTL 1: Japanese Patent Application Laid-Open (JP-A) No. 2007-084807

SUMMARY OF INVENTION

Technical Problem

An object of the present invention is to provide an inkjet recording ink having high ejection reliability, and capable of obtaining excellent color developing property on plain paper, and the inkjet recording ink which can be used in an inkjet head having an ink repellent layer containing a fluorine silane coupling agent or an ink repellent layer containing a silicone resin, without causing troubles, an ink cartridge, an inkjet recording method and a recorded matter using the inkjet recording ink. Another object of the present invention is to provide an inkjet recording inkset which can reduce color bleeding.

Solution to Problem

Means for solving the problems are as follows.

<1> An inkjet recording ink containing a colorant; a surfactant A; a surfactant B; a water soluble organic solvent; and water, wherein the surfactant A is expressed by any one of Structural Formula (1) and Structural Formula (2), and the surfactant B is expressed by Structural Formula (3):

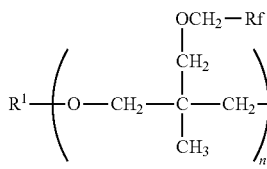
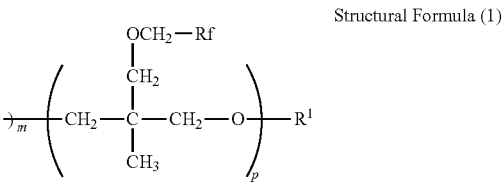

Structural Formula (1)

in Structural Formula (1), $R^1$ represents hydrogen, an alkyl group, or an acyl group; Rf represents $-CF_3$ or $-CF_2CF_3$; and m, n and p are natural numbers;

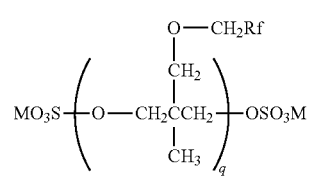

Structural Formula (2)

in Structural Formula (2), M represents alkali metal, ammonium, phosphonium, or alkanolamine; Rf represents $-CF_3$ or $-CF_2CF_3$; and q is a natural number;

Structural Formula (3)

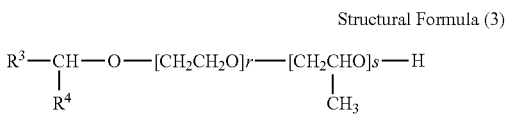

or

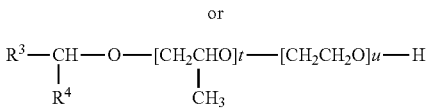

in Structural Formula (3), $R^3$ and $R^4$ each represent hydrogen or an alkyl group; and r, s, t and u are natural numbers.

<2> The inkjet recording ink according to <1>, wherein the colorant is a dispersion obtained by dispersing an organic pigment or a carbon black with a nonionic dispersant expressed by Structural Formula (4):

Structural Formula (4)

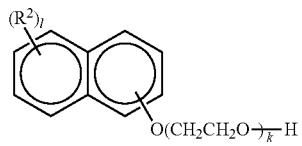

in Structural Formula (4), $R^2$ represents an alkyl group having 1 to 20 carbon atoms, an aralkyl group having 1 to 20 carbon atoms, or an allyl group; l is an integer of 0 to 7; and k is an integer of 20 to 80.

<3> The inkjet recording ink according to <1>, wherein the colorant is a self-dispersible pigment, which is obtained by forming a hydrophilic group on a surface of an organic pigment or a carbon black by reaction.

<4> The inkjet recording ink according to any one of <1> to <3>, further contains a resin emulsion.

<5> An inkjet recording inkset containing the inkjet recording ink according to any one of <1> to <4>, in which the colorant is a black colorant, which is defined as a black inkjet recording ink, and the inkjet recording ink according to any one of <1> to <4>, in which the colorant is a color colorant, which is defined as a color inkjet recording ink, wherein a ratio B/A of the surfactant B to the surfactant A in the black inkjet recording ink is larger than a ratio B/A of the surfactant B to the surfactant A in the color inkjet recording ink.

<6> An ink cartridge including any one of the inkjet recording ink according to any one of <1> to <4> and the inkjet recording inkset according to <5>.

<7> An inkjet recording method including ejecting an inkjet recording ink using an inkjet recording apparatus equipped with an inkjet head having any one of an ink repellent layer containing a fluorine silane coupling agent and an ink repellent layer containing a silicone resin, wherein the inkjet recording ink is the inkjet recording ink according to any one of <1> to <4>, or is contained in the inkjet recording inkset according to <5>.

<8> A recorded matter, which is recorded by using any one of the inkjet recording ink according to any one of <1> to <4> and the inkjet recording inkset according to <5>.

Advantageous Effects of Invention

The present invention can provide an inkjet recording ink having high ejection reliability and capable of obtaining excellent color developing property on plain paper, and the inkjet recording ink which can be used in an inkjet head having an ink repellent layer containing a fluorine silane coupling agent or an ink repellent layer containing a silicone resin, without causing troubles, an ink cartridge, an inkjet recording method and a recorded matter using the inkjet recording ink. Moreover, the present invention can provide an inkjet recording inkset which can reduce color bleeding.

DESCRIPTION OF EMBODIMENTS

Inkjet Recording Ink

Figure 1:
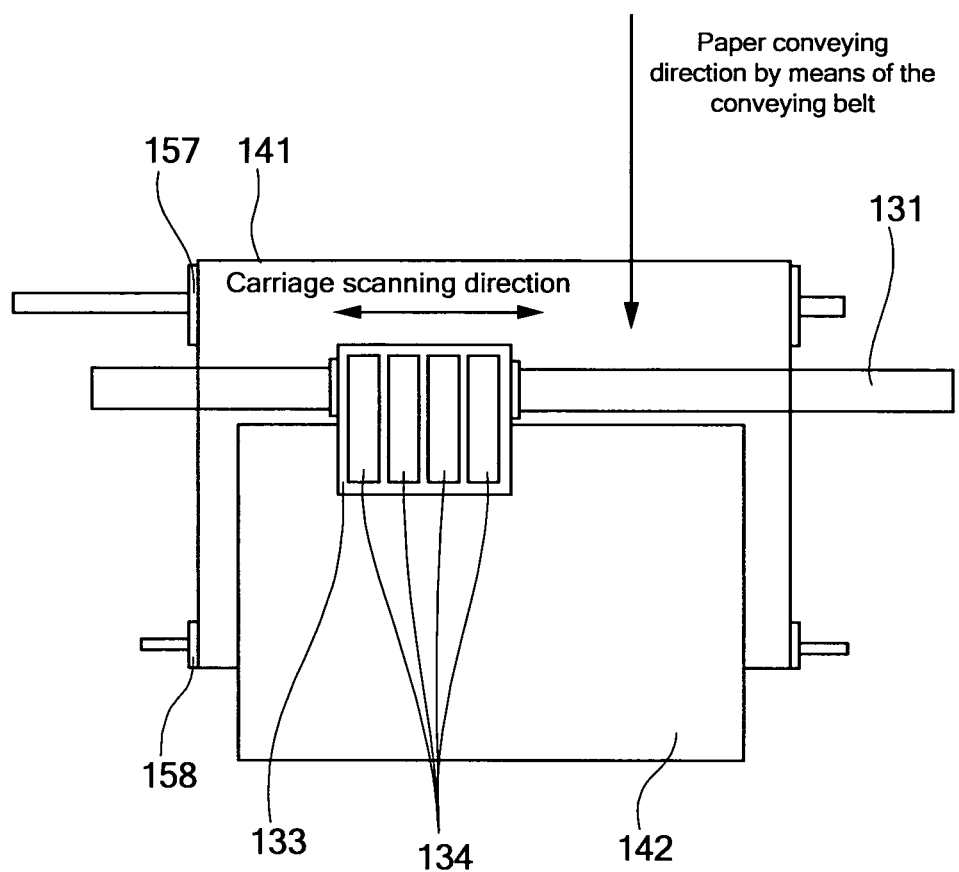
FIG. 1 is an example of a schematic plan view showing a main portion of a mechanism part of an inkjet recording apparatus.

An inkjet recording ink of the present invention contains at least a colorant, a surfactant A, a surfactant B, a water soluble organic solvent and water, and may contain other components as necessary.

<Surfactant A and Surfactant B>

A penetrating agent is added in the inkjet recording ink (also referred to as ink), so as to decrease a surface tension of the ink and the ink rapidly penetrates into a recording medium when an ink droplet is attached onto the recording medium such as paper. Thus, feathering and color bleeding can be decreased. In the present invention, as the penetrating agent, the surfactant A, which is a fluorine surfactant, expressed by any one of Structural Formula (1) and Structural Formula (2), and the surfactant B, which is a nonionic surfactant, expressed by Structural Formula (3) are used.

Structural Formula (1)

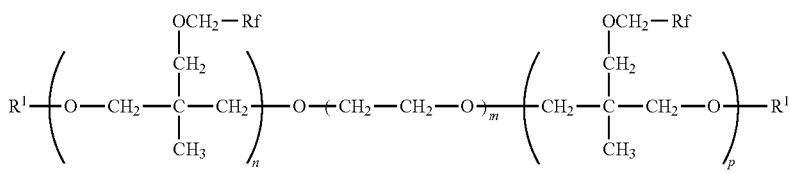

In Structural Formula (1), $R^1$ represents hydrogen, an alkyl group, or an acyl group; Rf represents $-CF_3$ or $-CF_2CF_3$; and m, n and p are natural numbers.

Structural Formula (2)

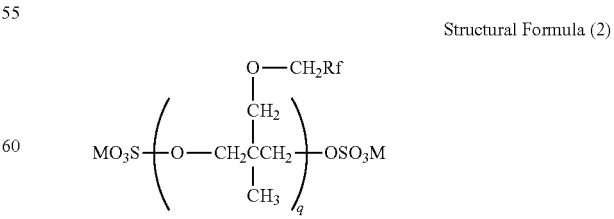

In Structural Formula (2), M represents alkali metal, ammonium, phosphonium, or alkanolamine; Rf represents $-CF_3$ or $-CF_2CF_3$; and q is a natural number.

Structural Formula (3)

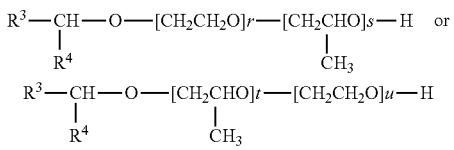

In Structural Formula (3), $R^3$ and $R^4$ each represent hydrogen or an alkyl group; and r, s, t and u are natural numbers.

The fluorine surfactant is excellent in penetrating property and antifoaming, but may cause problems in ink storage ability and attachments of the ink to a head. Particularly, the fluorine surfactant is likely to cause adhesion of the dried ink to an inkjet head which has either an ink repellent layer containing a fluorine silane coupling agent or an ink repellent layer containing a silicone resin.

On the other hand, the nonionic surfactant is excellent in the ink storage ability, but may cause problems in the penetrating property, antifoaming and ink attachment to a head.

However, when the surfactant A and the surfactant B are combined, each advantage of the surfactant A and the surfactant B is utilized so as to not only improve the penetrating property, antifoaming, and ink storage ability, but also decrease the ink attachment to a head caused by the use of either the surfactant A or B (see Table 1). This is an unforeseeable amazing result, and its mechanism has been studied, but has not yet been clarified.

TABLE 1

| | Penetrating property | Antifoaming | Ink storage ability | Ink attachment to head |
|---|---|---|---|---|
| Conventional art Surfactant A (fluorine surfactant) | A | A | B | B |
| Conventional art Surfactant B (nonionic surfactant) | B | B | A | B |
| The present invention Surfactant A and B | A | A | A | A |

A: Excellent
B: Problems occur.

The surfactant A less foams and is effective for reliability and improvement in color development, among fluorine surfactants. Examples of commercially available surfactants A include POLYFOX PF-151N as the surfactant A expressed by Structural Formula (1), POLYFOX PF-136A, PF-156A as the surfactant A expressed by Structural Formula (2) (all of these are manufactured by OMNOVA Solutions Inc.).

$R^1$ in Structural Formula (1) in the above-described commercially available surfactant is hydrogen, and hydrogen is preferable in terms of the storage stability. Moreover, $R^1$ may represent an alkyl group or an acyl group. Rf in Structural Formula (1) in the above-described commercially available surfactants is —$CF_2CF_3$. However, from the viewpoint that Rf in Structural Formula (2) in the above-described commercially available surfactants represents —$CF_3$ or —$CF_2CF_3$, it is considered that the same effect can be obtained in the case where Rf in Structural Formula (1) is —$CF_3$. As for "m", "n" and "p" in Structural Formula (1) in the above-described commercially available surfactants, m is 21, n is up to 4, p is up to 4. "m" represents the number of unit having hydrophilicity, and "n" and "p" each represent the number of unit having lipophilicity. Thus, the surfactant A expressed by Structural Formula (1) can be used in the case where the balance between the hydrophilicity and the lipophilicity can be maintained, for example, approximately, m=10 to 30, n+p=4 to 10.

"M" in Structural Formula (2) is ammonium in the above-described commercially available surfactants. "M" is not particularly limited as long as it can form sulfonate, and "M" may be alkali metal, phosphonium, alkanolamine, or the like. "q" in the above-described commercially available surfactants is 6, and "q" represents the number of unit having lipophilicity. Thus, the surfactant A expressed by Structural Formula (2) can be used in the case where the balance between the hydrophilicity and the lipophilicity can be maintained, for example, approximately, q=4 to 10.

The surfactant A preferably has a surface tension of 20 mN/m to 35 mN/m. The amount of the surfactant A in the ink is preferably 0.05% by mass to 5% by mass, and more preferably 0.1% by mass to 3% by mass.

The surfactant B is particularly excellent in the storage stability, among nonionic surfactants. Examples of commercially available surfactants B include SOFTANOL EP5035, SOFTANOL EP9050, SOFTANOL EP7025, and SOFTANOL EP7045 (manufactured by NIPPON SHOKUBAI CO., LTD); and EMALEX DAPE-0205, EMALEX DAPE-0207, EMALEX DAPE-0210, and EMALEX DAPE-0212 (manufactured by NIHON EMULSION Co., Ltd.).

$R^3$ and $R^4$ in Structural Formula (3) in the above-described commercially available surfactants represent a combination of an alkyl group having 9 carbon atoms and hydrogen, or are alkyl groups in which a sum of carbon atoms in $R^3$ and $R^4$ are 11 to 13. When each of $R^3$ and $R^4$ is hydrogen or an alkyl group having carbon atoms of 10 or less, the surfactant B does not largely impact on properties of compounds, and is considered to be usable. As to "r", "s", "t" and "u" in the above-described commercially available surfactants, "r" is 5 to 9, "s" is 2.5 to 5, "t" is 2, and "u" is 7 to 12. "r" and "u" each represent the number of the unit of ethylene oxide and "s" and "t" each represent the number of the unit of propylene oxide. From the viewpoint that propylene oxide has lower hydrophilicity than that of ethylene oxide, the surfactant B expressed by Structural Formula (3) can be used, wherein "r", "s", "t", and "u" are respectively selected from about 12 or less so that the balance between the hydrophilicity and the lipophilicity can be maintained.

The amount of the surfactant B in the ink is preferably 0.05% by mass to 5% by mass, and more preferably 0.1% by mass to 3% by mass.

Moreover, the ink of the present invention, other surfactants such as anionic surfactants, acetylene glycol surfactants, and the like, may also be used in combination, as long as the effect obtained by combining the surfactant A with the surfactant B is not impaired.

Furthermore, in order to enhance the penetrating property, polyol having 8 to 11 carbon atoms, such as 2-ethyl-1,3-hexanediol, 2,2,4-trimethyl-1,3-pentanediol, may also be used in the ink of the present invention.

<Colorant>

As the colorant, dyes and pigments are used.

Examples of the pigments include organic pigments such as azo pigments, phthalocyanine pigments, anthraquinone pigments, dioxazine pigments, indigo pigments, thioindigo pigments, perylene pigments, isoindolinone pigments, aniline black pigments, azomethine pigments and rhodamine B lake pigments; and inorganic pigments such as carbon blacks, iron oxides, titanium oxides, calcium carbonate, barium sulfate, aluminum hydroxide, barium yellow, iron blue, cadmium red, chrome yellow and metal particles.

Examples of black pigments include carbon blacks (C. I. Pigment Black 7) such as furnace black, lamp black, acetylene black, and channel black, metals such as copper oxides, iron oxides, (C. I. Pigment Black 11), and titanium oxides, and organic pigments such as aniline black (C. I. Pigment Black 1).

Examples of yellow pigments include C. I. Pigment Yellow 1 (Fast Yellow G), 2, 3, 12 (Disazo Yellow AAA), 13, 14, 16, 17, 20, 23, 24, 34, 35, 37, 42 (yellow iron oxide), 53, 55, 73, 74, 75, 81, 83 (Disazo Yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180, 185.

Examples of magenta pigments include C. I. Pigment Violet 19, C. I. Pigment Red 1, 2, 3, 5, 7, 9, 12, 17, 22 (Brilliant Fast Scarlet), 23, 31, 38, 48:1 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 97, 101 (iron oxide red), 104, 105, 106, 108 (cadmium red), 112, 114, 122 (dimethylquinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255, 272.

Examples of cyan pigments include C. I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 16, 17:1, 22, 56, 60, 63, 64, Vat Blue 4, and Vat Blue 60.

Examples of pigments for intermediate colors, i.e., red, green, and blue, include C. I. Pigment Red 177, 194, 224, C. I. Pigment Orange 16, 36, 43, 51, 55, 59, 61, 71, C. I. Pigment Violet 3, 19, 23, 29, 30, 37, 40, 50 and C. I. Pigment Green 7, 36.

Of these pigments, a carbon black is preferably used as the black pigment. A preferred carbon black is produced by a furnace method and a channel method, and has a primary particle diameter of 15 nm to 40 nm, a specific surface area determined by a BET adsorption method of 50 $m^2/g$ to 300 $m^2/g$, a DBP oil adsorption amount of 40 mL/100 g to 150 mL/100 g, a volatile fraction of 0.5% to 10%, and a pH value of 2 to 9. An acidic carbon black having pH of 6 or less is particularly preferable because of high concentration.

Of these pigments, as the color pigments, C. I. Pigment Yellow 13, 17, 55, 74, 93, 97, 98, 110, 128, 139, 147, 150, 151, 154, 155, 180, 185; C. I. Pigment Red 122, 202, 209; C. I. Pigment Violet 19; and C. I. Pigment Blue 15:3, 15:4 are particularly preferable.

The average particle diameter of the pigment is not particularly limited and may be appropriately selected according to the purpose. It is preferably 20 nm to 200 nm, more preferably 30 nm to 150 nm, and still more preferably 50 nm to 100 nm. When the average particle diameter of the pigment is more than 200 nm, the color saturation of a printed image may be decreased, and additionally, thickening and aggregation during ink storage and nozzle clogging during printing may easily occur. On the other hand, when the average particle diameter of the pigment is less than 20 nm, light resistance is decreased and storage stability tends to be poor.

In the present invention, the average particle diameter of the pigment means a 50% average particle diameter (D50) measured on a sample which is diluted with pure water to a pigment concentration of 0.01% by mass, using MICROTRAC UPA-150 (manufactured by NIKKISO CO., LTD.) at 23° C. under the conditions of a particle refractive index of 1.51, a particle density of 1.4 $g/cm^3$ and a pure water parameter as a solvent parameter.

The amount of the pigment in the ink is preferably 2% by mass to 15% by mass, more preferably 3% by mass to 12% by mass, and still more preferably 4% by mass to 10% by mass. When the amount of the pigment is less than 2% by mass, coloring power is not sufficient, and an image tends to be inferior in brightness. When the amount of the pigment is more than 15% by mass, the storage stability of ink is decreased and a dull image is obtained.

Generally, a dispersant is used for a pigment ink. A nonionic surfactant dispersant or an anionic surfactant dispersant is appropriately selected according to types of pigments or ink formula.

Examples the nonionic surfactant include polyoxyethylene alkylether such as polyoxyethylene lauryl ether, polyoxyethylene myristyl ether, polyoxyethylene cetyl ether, polyoxyethylene stearyl ether, polyoxyethylene oleyl ether; polyoxyethylene alkylphenyl ether such as polyoxyethylene octylphenyl ether, polyoxyethylene nonylphenyl ether; polyoxyethylene α-naphthylether, polyoxyethylene β-naphthylether, polyoxyethylene monostyryl phenyl ether, polyoxyethylene distyryl phenyl ether, polyoxyethylene alkyl naphthyl ether, polyoxyethylene monostyryl naphthyl ether, polyoxyethylene distyryl naphthyl ether, and a polyoxyethylene-polyoxypropylene block copolymer. Moreover, examples thereof further include surfactants in which a part of polyoxyethylene of the nonionic surfactant listed above is substituted with polyoxypropylene, and surfactants prepared by condensing aromatic ring-containing compounds, such as polyoxyethylene alkyl phenyl ether, with formalin.

Hydrophilic lipophilic balance (HLB) of the nonionic surfactant is preferably 12 to 19.5, and more preferably 13 to 19. When HLB is less than 12, the surfactant is not uniformly dispersed in a dispersion medium, adversely affecting dispersion stability. When HLB is more than 19.5, the surfactant less adheres to the pigment, adversely affecting dispersion stability.

Examples of anionic surfactants include a polyoxyethylene alkylether sulfate, polyoxyethylene alkylphenylether sulfate, polyoxyethylene monostyryl phenyl ether sulfate, polyoxyethylene distyryl phenyl ether sulfate, polyoxyethylene alkyl ether phosphate, polyoxyethylene alkylphenylether phosphate, polyoxyethylene monostyryl phenyl ether phosphate, polyoxyethylene distyryl phenyl ether phosphate, polyoxyethylene alkyl ether carboxylate, polyoxyethylene alkylphenylether carboxylate, polyoxyethylene monostyrylphenyl ether carboxylate, polyoxyethylene distyryl phenyl ether carboxylate, naphthalenesulfonate-formalin condensates, melaminesulfonate-formalin condensates, dialkyl sulfosuccinate, alkyl disulfosuccinate, polyoxyethylene alkyl disulfosuccinate, alkylsulfo acetate, α-olefin sulfonate, alkyl benzene sulfonate, alkyl naphthalene sulfonate, alkyl sulfonate, N-acyl amino acid salt, acyl peptide and soap. Of these, sulfates or phosphates of polyoxyethylene alkylether, polyoxyethylene alkylphenylether, and polyoxyethylene distyryl phenylether are particularly preferable.

In terms of improvement of the storage stability of the pigment ink, a nonionic dispersant expressed by Structural Formula (4) is particularly preferable.

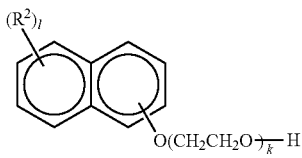

Structural Formula (4)

As to "$R^2$", "l" and "k" in Structural Formula (4), in Examples a nonionic dispersant expressed by Structural Formula (6), where l=0, k=50, and a nonionic dispersant expressed by Structural Formula (5), where $R^2=C_{12}H_{25}$, l=1, k=42, are used. However, it is possible to use the nonionic dispersant expressed by Structural Formula (4), where "$R^2$" may be an alkyl group having 1 to 20 carbon atoms, an aralkyl group having 1 to 20 carbon atoms, or an allyl group, "l" is an integer of 0 to 7, and k is 20 to 80.

The amount of a surfactant dispersant is approximately 10% by mass to 50% by mass with respect to the amount of the pigment. When the amount is less than 10% by mass of the pigment, the storage stability of the pigment dispersion and ink is degraded, and dispersion may take extremely long time. When the amount is more than 50% by mass, the ink viscosity becomes extremely high, and ejection stability tends to be degraded.

The dyes are classified based on the color index thereof into acidic dyes, direct dyes, basic dyes, reactive dyes and food dyes, and it is preferred that dyes having high resistance to water and light be used. These dyes may be used by combining a plurality of types of dyes, or by combining with other colorants such as pigments as necessary. However, other colorants are necessary to be added to the degree which does not inhibit the effect of the present invention.

Examples of the dyes include the following (a) to (d).

(a) Examples of acidic dyes and food dyes include C. I. Acid Yellow 17, 23, 42, 44, 79, 142; C. I. Acid Red 1, 8, 13, 14, 18, 26, 27, 35, 37, 42, 52, 82, 87, 89, 92, 97, 106, 111, 114, 115, 134, 186, 249, 254, 289; C. I. Acid Blue 9, 29, 45, 92, 249; C. I. Acid Black 1, 2, 7, 24, 26, 94; C. I. Food Yellow 3, 4; C. I. Food Red 7, 9, 14; and C. I. Food Black 1, 2.

(b) Examples of direct dyes include C. I. Direct Yellow 1, 12, 24, 26, 33, 44, 50, 86, 120, 132, 142, 144; C. I. Direct Red 1, 4, 9, 13, 17, 20, 28, 31, 39, 80, 81, 83, 89, 225, 227; C. I. Direct Orange 26, 29, 62, 102; C. I. Direct Blue 1, 2, 6, 15, 22, 25, 71, 76, 79, 86, 87, 90, 98, 163, 165, 199, 202; and C. I. Direct Black 19, 22, 32, 38, 51, 56, 71, 74, 75, 77, 154, 168, 171.

(c) Examples of basic dyes include C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C. I. Basic Black 2, 8.

(d) Examples of reactive dyes include C. I. Reactive Black 3, 4, 7, 11, 12, 17; C. I. Reactive Yellow 1, 5, 11, 13, 14, 20, 21, 22, 25, 40, 47, 51, 55, 65, 67; C. I. Reactive Red 1, 14, 17, 25, 26, 32, 37, 44, 46, 55, 60, 66, 74, 79, 96, 97; and C. I. Reactive Blue 1, 2, 7, 14, 15, 23, 32, 35, 38, 41, 63, 80, 95.

<Water-Soluble Organic Solvent "Wetting Agent">

The ink of the present invention uses water as a liquid medium; however, the following water-soluble organic solvents may be used in order to prevent drying of the ink (serving as a "wetting agent") and to improve dispersion stability, etc.

Examples thereof include polyhydric alcohols such as glycerin, diethylene glycol, 1,3-butanediol, 3-methyl-1,3-butanediol, triethylene glycol, propylene glycol, dipropylene glycol, trimethylolpropane, trimethylolethane, ethylene glycol, diethylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and petriol; polyhydric alcohol alkyl ethers such as ethylene glycol monoethyl ether and ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether, and polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, and 8-caprolactam, γ-butyrolactone; amides such as formamide, N-methylformamide, N,N-dimethyl formamide; amines such as monoethanolamine, diethanolamine, triethanolamine, monoethylamine, diethylamine, triethylamine; sulfur-containing compounds such as dimethylsulfoxide, sulfolan, and thiodiethanol; propylene carbonate, and ethylene carbonate.

These water-soluble organic solvents may be used in combination.

In addition to the water-soluble organic solvents, other wetting agents may be used and preferably contain urea compounds and sugars. Examples of the sugars include monosaccharides, disaccharides, oligosaccharides (including trisaccharides and tetrasaccharides) and polysaccharides. Specific examples include glucose, mannose, fructose, ribose, xylose, arabinose, galactose, maltose, cellobiose, lactose, sucrose, trehalose, and malt triose. The polysaccharides stated here are defined as sugars in a broad sense, which contain materials that broadly exist in the realm of nature such as α-cyclodextrin, cellulose, and the like.

Examples of derivatives of these sugars include reducing sugars of the above sugars, such as sugar alcohol expressed by General Formula: $HOCH_2(CHOH)_nCH_2OH$ where "n" represents an integer of 2 to 5; oxidized sugar such as aldonic acid and uronic acid; amino acid, and thio acid. Of these, sugar alcohol is preferable and specific examples thereof include D-sorbitol, sorbitan, maltitol, erythritol, lactitol, and xylitol.

Particularly, in the present invention, glycerin, diethylene glycol, triethylene glycol, 1,3-butanediol 1,6-hexanediol, propylene glycol, 1,5-pentanediol, dipropylene glycol, trimethylolpropane, tetramethylolpropane, 3-methyl-1,3-butanediol, D-sorbitol, and xylitol are used, so that the ink excellent in storage stability and ejection stability can be produced.

In the case of the pigment ink, the ratio of the pigment to the wetting agent significantly affects the ink ejection stability from a head. When the amount of the wetting agent is relatively small even though the solid content of the pigment is large, water evaporation near the ink meniscus of the nozzle progresses, causing ejection failure.

The amount of the wetting agent is approximately 10% by mass to 50% by mass relative to the total amount of the ink. A ratio of the total mass of the colorant and resin emulsion relative to the total mass of the wetting agent in the ink is preferably 0.5 to 12.5, more preferably 1.0 to 6.0, and still more preferably 2.0 to 5.0. The ink having the ratio within this range is remarkably excellent in drying property, storage test, and reliability test.

In the ink of the present invention, a resin emulsion is preferably added mainly for the purpose of enhancement of friction resistance of an image, and of storage stability when a pigment is used as the colorant. For the enhancement of the friction resistance of an image, an emulsion of an acrylic resin, a styrene-acrylic resin, an acrylic silicone resin, or a fluorine resin is preferably used. For the enhancement of the storage stability, an emulsion of a polyurethane resin, an acrylic resin, or a styrene-acrylic resin is preferably used. However, there are not so many resin emulsions which can attain the enhancement of both the friction resistance of an image and the storage stability, thus, two resin emulsions may be used in combination. These resin emulsions can be appropriately selected from commercially available resin emulsions as necessary.

Typical resin emulsions will be exemplified as follows.

(1) Urethane Resin Emulsion

A urethane resin of the urethane resin emulsion is obtained by polymerizing polyisocyanate with polyether polyol, polyester polyol, polylactone polyol, polycarbonate polyol, or the like.

Examples of polyisocyanates include aliphatic diisocyanate compounds such as hexamethylene diisocyanate, 2,2,4-trimethylhexamethylene diisocyanate; alicyclic diisocyanate compounds such as isophorone diisocyanate, hydrogenerated xylylene diisocyanate, 1,4-cyclohexane diisocyanate, 4,4'-dicyclohexylmethane diisocyanate; aromatic aliphatic diisocyanate compounds such as xylylene diisocyanate, tetramethyl xylene diisocyanate; aromatic diisocyanate compounds such as tolylene diisocyanate, phenylmethane diisocyanate; and modified compounds of these diisocyanates (carbodiimide-, uretodione-, and uretoimine-containing modified compounds).

Examples of polyether polyols include polyethylene glycol, polypropylene glycol, polytetramethylene ether glycol, and polyhexamethylene ether glycol.

Examples of polyester polyols include polyethylene adipate, polybutylene adipate, polyneopentyl adipate, poly-3-methylpentyl adipate, polyethylene/butylene adipate, and polyneopentyl/hexyl adipate.

Examples of polylactone polyols include polycaprolactone diol, and poly ω-hydroxycaproic acid polyol.

Examples of polycarbonate polyols include those known products obtained by reaction of: diols such as propanediol-(1,3), butanediol-(1,4), hexanediol-(1,6), diethylene glycol, triethylene glycol, tetraethylene glycol; bisphenol A; and phosgene, carbonyl chloride, diaryl carbonates such as diphenyl carbonate, or cyclic carbonates such as ethylene carbonate and propylene carbonate.

(2) Acrylic Resin Emulsion

An acrylic resin of the acrylic resin emulsion is obtained by polymerizing an acrylic monomer alone or copolymerizing an acrylic monomer with the other monomer.

Examples of the acrylic monomer include methylacrylate, ethylacrylate, n-propylacrylate, isopropylacrylate, n-butylacrylate, isobutylacrylate, t-butylacrylate, n-pentylacrylate, isopentylacrylate, neopentylacrylate, 3-(methyl)butylacrylate, 2-ethylhexylacrylate, hexylacrylate, cyclohexylacrylate, octylacrylate, nonylacrylate, decylacrylate, undecylacrylate, dodecylacrylate, phenylacrylate, methylmethacrylate, n-propylmethacrylate, isopropylmethacrylate, n-butylmethacrylate, isobutylmethacrylate, t-butylmethacrylate, n-pentylmethacrylate, isopentylmethacrylate, neopentylmethacrylate, 3-(methyl)butylmethacrylate, 2-ethylhexylmethacrylate, hexylmethacrylate, octylmethacrylate, nonylmethacrylate, decylmethacrylate, undecylmethacrylate, dodecylmethacrylate, acrylic acid, methacrylic acid, acrylamide, methacrylamide, acrylonitrile and methacrylonitrile.

Examples of the monomer include styrene, o-methylstyrene, m-methylstyrene, p-methylstyrene, α-methylstyrene, p-ethylstyrene, 2,4-dimethylstyrene, p-tert-butylstyrene, p-chlorostyrene, and vinyl aromatic hydrocarbons such as divinylbenzene; unsaturated carboxylic acids such as itaconic acid, and maleic acid; N-substituted maleimide, maleic anhydride, (meth)acrylonitrile, vinyl ketone, vinyl acetate, and vinylidene chloride.

The resin emulsion exhibits further excellent water dispersibility by introducing an ionic group to a resin. Examples of the ionic group include a sulfonic acid group, a carboxylic acid group, sulfuric acid group, a phosphoric acid group, a phosphonic acid group, a phosphinic acid group, an alkali metal salt group thereof, an alkaline-earth metal salt group thereof, an ammonium salt group thereof, and a primary to tertiary amine group thereof. Of these, a carboxylic acid alkali metal salt group, a carboxylic acid ammonium salt group, a sulfonic acid alkali metal salt group and a sulfonic acid ammonium salt group are preferable. A sulfonic acid alkali metal salt group and a sulfonic acid ammonium salt group are particularly preferable in terms of water dispersion stability. The ionic group can be introduced by adding a monomer having an ionic group upon synthesis of a resin. As a salt, salts of Li, K or Na are preferable.

<Other Component>

In the ink of the present invention, in addition to the above-described components, conventionally known additives such as a pH adjuster, an antiseptic/antifungal agent, an antirust agent, a chelating agent, and the like, may be added.

The pH adjuster is added to stabilize the dispersed condition by way of maintaining the ink composition at an alkalinity, thereby stabilizing the ejection. When the pH of the ink composition is 11 or more, the ink composition tends to dissolve inkjet heads or ink-supplying units to the significant level, thus depending on materials of heads and units such problems may occur as deterioration, leakage, or ejection failure of the ink after long term use. In the case of a pigment, it is preferred that the pH adjuster be added upon mixing and dispersing the pigment with a dispersant into water rather than the pH adjuster is added with additives such as a wetting agent, a penetrating agent, etc. after the pigment and the dispersant are mixed and dispersed into water, since some types of pH adjusters may impair the dispersion.

The pH adjuster preferably includes at least one of alcohol amines, alkaline metal hydroxides, ammonium hydroxides, phosphonium hydroxides, and alkaline metal carbonates.

Examples of the alcohol amines include diethanolamine, triethanolamine, and 2-amino-2-ethyl-1,3-propanediol. Examples of the alkaline metal hydroxides include lithium hydroxide, sodium hydroxide, and potassium hydroxide. Examples of the ammonium hydroxides include ammonium hydroxide and quaternary ammonium hydroxide. Examples of the phosphonium hydroxides include quaternary phosphonium hydroxide. Examples of the alkaline metal carbonates include lithium carbonate, sodium carbonate, and potassium carbonate.

Examples of the antiseptic/antifungal agents include sodium dehydroacetate, sodium sorbate, sodium 2-pyridinethiol-1-oxide, sodium benzoate, and sodium pentachlorophenol.

Examples of the antirust agents include acidic sulfite, sodium thiosulfate, thiodiglycolic acid ammonium, diisopropylammonium nitrite, pentaerythritol tetranitrate, and dicyclohexylammonium nitrite.

Examples of the chelating reagents include sodium ethylenediamine tetraacetate, sodium nitrilotriacetate, sodium hydroxyethyl ethylenediamine triacetate, sodium diethylenetriamine pentaacetate, and sodium uramil diacetate.

The ink of the present invention can be suitably used in various recording apparatuses by an inkjet recording method, such as inkjet recording printers, facsimile machines, copiers, and printer/facsimile/copier complex apparatuses. Moreover, the ink of the present invention has an excellent properties in which ink attachment to a head does not occur in a recording apparatus equipped with an inkjet head having any one of the ink repellent layer containing a fluorine silane coupling agent and the ink repellent layer containing a silicone resin.

(Inkjet Recording Inkset)

An inkjet recording inkset of the present invention includes an inkjet recording ink in which the colorant is a black colorant (black ink), and an inkjet recording ink in which the colorant is a color colorant (color ink).

When a ratio "B/A" of the surfactant B to the surfactant A in the black ink is larger than a ratio "B/A" of the surfactant B to the surfactant A in the color ink, the force of the black ink that pulls the color ink becomes strongly at the boundary between the black ink and the color ink. As a result, the color ink is drawn into the black ink, and bleeding at the boundary less stands out, thereby decreasing color bleeding.

Moreover, the ratio B/A in the black ink is preferably 2 or more, because no ink ejection from a nozzle during printing is decreased.

In view of the ratio B/A, the total amount of the surfactant A and the surfactant B in the ink is preferably 0.5% by mass to 1.5% by mass. When the total amount of the surfactant A and the surfactant B is 0.5% by mass or more, the low image density due to insufficient penetrating property may not occur. When the total amount of the surfactant A and the surfactant B is 1.5% by mass or less, difficulty in ejection of the ink due to excessively high ink viscosity may not occur.

(Inkjet Recording Apparatus and Inkjet Recording Method)

Next, an example of an inkjet recording apparatus will be explained with reference to FIGS. 1 and 2.

The inkjet recording apparatus shown in FIG. 1 includes four inkjet heads 134 which eject ink droplets to a recording paper 142, a carriage 133, on which four inkjet heads 134 are mounted so as to move in a carriage scanning direction (main scanning direction), an endless conveying belt 141 which conveys the recording paper 142 in a belt (paper) conveying direction (vertical scanning direction), and a driving roller 157 and a driven roller 158, around which the conveying belt is stretched.

Moreover, ink cartridges which introduce inkjet recording inks (hereinafter also referred to as "inks") for respective colors (for example, yellow, cyan, magenta, and black) to respective inkjet heads 134, a carriage driving part which moves the carriage 133 in the carriage scanning direction, a belt driving part which rotates the driving roller 157 so as to move the conveying belt 141, a head driver which drives the respective inkjet heads 134 to eject the inks, and a maintenance device which is provided in an end of a region scanned by the carriage 133 and performs maintenance with respect to the respective inkjet heads 134. The maintenance device consists of a cap, a wiper blade, an idle ejection receiver, a wiper cleaner, and the like.

The inkjet recording apparatus forms (prints) an image on the recording paper 142 by ejecting the inks for each color from the four inkjet heads 134 onto the recording paper 142 while the four inkjet heads 134 are moved in the carriage scanning direction via the carriage 133, and conveying the recording paper 142 to the belt conveying direction.

Figure 2:
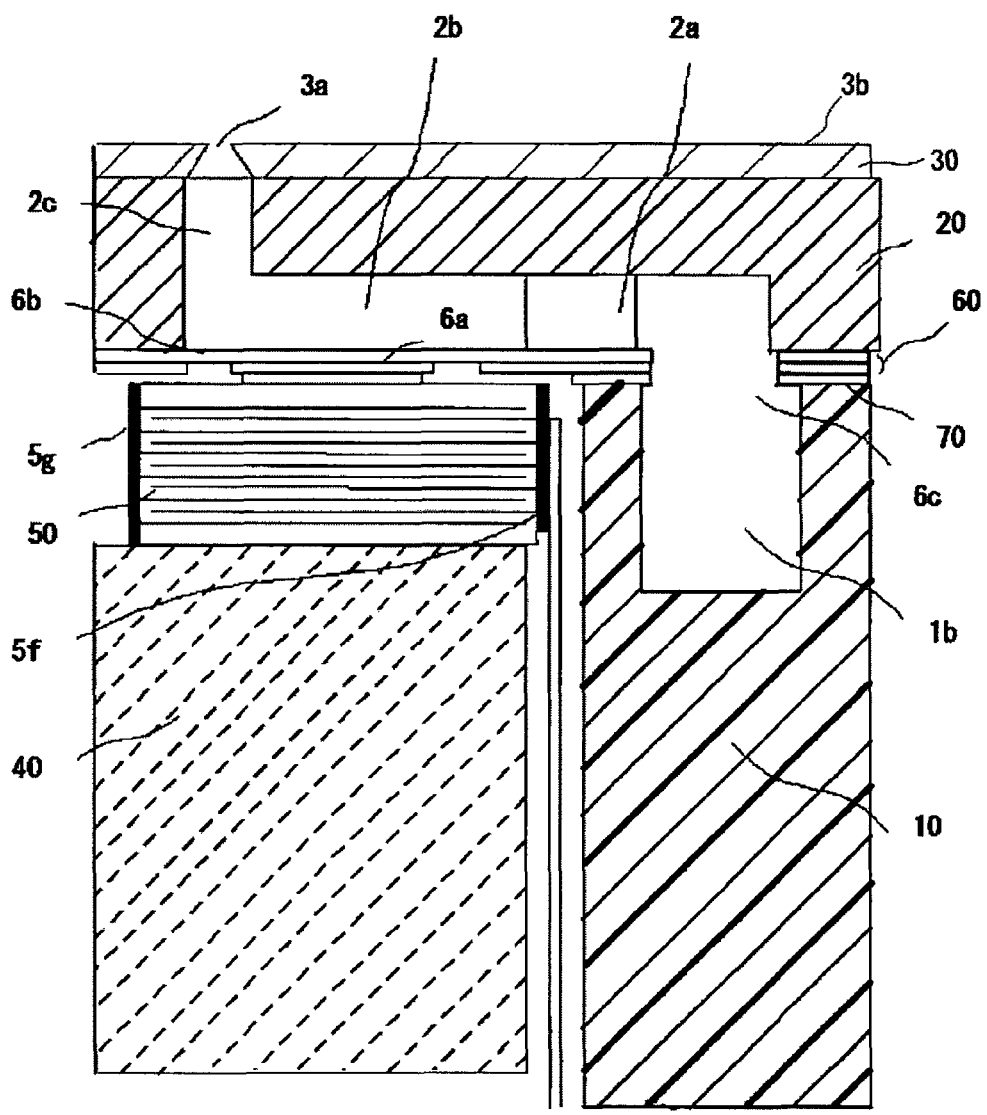
FIG. 2 is an example of an enlarged view of a main portion of an inkjet head.

As shown in FIG. 2, each inkjet head is piezoelectric type, and includes an ink supply port (not shown), a frame 10 having a cavity serving as a common liquid chamber 1b, a fluid resistance portion 2a, a pressurized fluid chamber 2b formed as a cavity, a channel plate 20 having a link port 2c linked to a nozzle 3a, a nozzle plate 30 having a plurality of nozzles 3a, a laminated piezoelectric element 50, to which a drive waveform is applied from the head driver, the laminated piezoelectric element 50 being fixed on a base 40, a convex portion 6a joined to the laminated piezoelectric element 50, an oscillation plate 60 having a diaphragm portion 6b and an ink inflow port 6c, and an adhesive layer 70 joining the laminated piezoelectric element 50 with the oscillation plate 60. Each inkjet head is not limited to the piezoelectric type, but may be a thermal type, an electrostatic type, or the like.

The nozzle plate 30 is formed of a metal material, e.g., of a Ni plated film obtained by electroforming. An ink repellent layer 3b (a liquid repellent layer) according to the present invention is formed on a front surface of an ink ejection surface of the nozzle plate 30 (a front surface of a droplet ejection surface).

The ink repellent layer is formed on the nozzle plate surface of the inkjet head by a method, such as polytetrafluoroethylene (PTFE)-Ni eutectoid plating, an electrodeposition coating with a fluorine resin, vapor deposition of evaporable fluorine resin (such as fluorinated pitch), coating with a silicone resin or a fluorine resin, or the like. In order to keep sufficient ink repellency to an ink having low surface tension and high penetrating property, the ink repellent layer containing a fluorine silane coupling agent or the ink repellent layer containing a silicone resin is preferably formed.

When the ink repellent layer containing a fluorine silane coupling agent is formed, an inorganic oxide layer may be formed between a nozzle substrate and the ink repellent layer, so that many hydroxyl groups serving as binding points with the fluorine silane coupling agent are present, thereby improving adhesion properties. Examples of materials for the inorganic oxide layer include $SiO_2$ and $TiO_2$. The inorganic oxide layer preferably has a thickness of 10 Å (1 nm) to 2,000 Å (200 nm), and more preferably 100 Å (10 nm) to 1,000 Å (100 nm).

The fluorine silane coupling agent is not particularly limited and may be appropriately selected according to the purpose. Examples thereof include those disclosed in Japanese Patent Application Publication (JP-B) No. 03-43065, JP-A Nos. 06-210857, 10-32984, 2000-94567, 2002-145645, 2003-341070, 2007-106024, and 2007-125849. Modified perfluoropolyoxethane (OPTOOL DSX manufactured by Daikin Industries, Ltd.) is particularly preferable. In this case, the layer has a thickness of preferably 1 Å to 200 Å (0.1 nm to 20 nm), and more preferably 10 Å to 100 Å (1 nm to 10 nm).

Examples of the methods for forming the ink repellent layer containing a fluorine silane coupling agent include coating methods such as spin-coating, roll-coating, dipping, printing, and vapor deposition.

An ink repellent layer formed of the fluorine silane coupling agent has high physical durability, because the ink repellent layer forms chemical bondings with the under layer. However, the ink repellent layer does not have sufficient durability to chemical impact such as cutting of bonding, caused by attaching the ink to the ink repellent layer (ink adhesion property). However, by the use of the ink of the present invention, ink adhesion property to the ink repellent layer is considerably improved.

The silicone resin is a resin having a siloxane bond consisting of Si and O as a basic skeleton and is commercially available in various forms such as oils, resins, and elastomers. It has various physical properties such as heat resistance, releasing property, anti-foaming property, and adhesion property, in addition to the ink repellency which is important in the present invention. Silicone resins include silicone resins which are curable at room temperature, heat-curable silicone resins, ultraviolet ray curable resins, and the like, and the silicone resin may be selected in accordance with the production method and application.

Examples of the methods for forming the ink repellent layer containing a silicone resin on a nozzle surface include vacuum evaporation of a liquid silicone resin material; plasma-polymerization of a silicone oil; coating methods such as spin-coating, dipping, spray coating; and electrocoating. When the ink repellent layer is formed by a method other than the electrocoating, a nozzle hole and the back surface of a nozzle plate are masked with a photoresist, a water soluble resin or the like and an ink repellent layer is formed, and then the photoresist is peeled off and removed from the back surface of the nozzle plate, thereby the ink repellent layer containing a silicone resin can be formed on only the surface of the nozzle plate. The attention needs to be paid when the photoresist is peeled off using a strongly alkaline peeling agent, the peeling agent may damage the ink repellent layer.

The ink repellent layer containing a silicone resin has a thickness of preferably 0.1 μm to 5.0 μm, and more preferably 0.1 μm to 1.0 μm. When the thickness of the ink repellent layer is less than 0.1 μm, the resistance to wiping may be poor and the ink repellency may degrade in the case where the inkjet head is used for a long period of time. When the thickness is more than 5.0 μm, the production cost may increase because the ink repellent layer is excessively thickened.

(Ink Cartridge)

Each ink constituting the inkset of the present invention is contained in a container and used as an ink cartridge. The ink cartridge may be provided with other members which are appropriately selected, as necessary.

The container is not particularly limited, and the shape, structure, size and material thereof may be appropriately selected according to the purpose. For example, the container having at least an ink bag formed of an aluminum laminated film, a resin film, or the like is preferred.

The ink cartridge will be explained with reference to FIGS. 3 and 4. Here, FIG. 3 is a schematic view showing an example of an ink bag 241 of an ink cartridge used in the present invention, and FIG. 4 is a schematic view showing an ink cartridge 200, in which the ink bag 241 shown in FIG. 3 is contained in a cartridge case 244.

Figure 3:
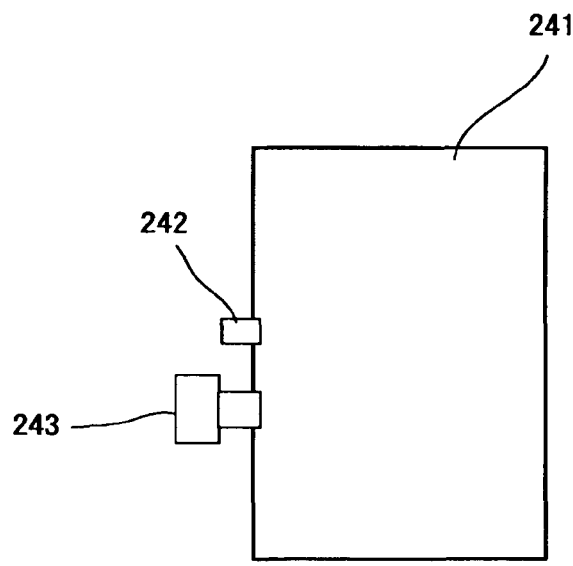
FIG. 3 is a schematic view showing an example of an ink bag of an ink cartridge of the present invention.
Figure 4:
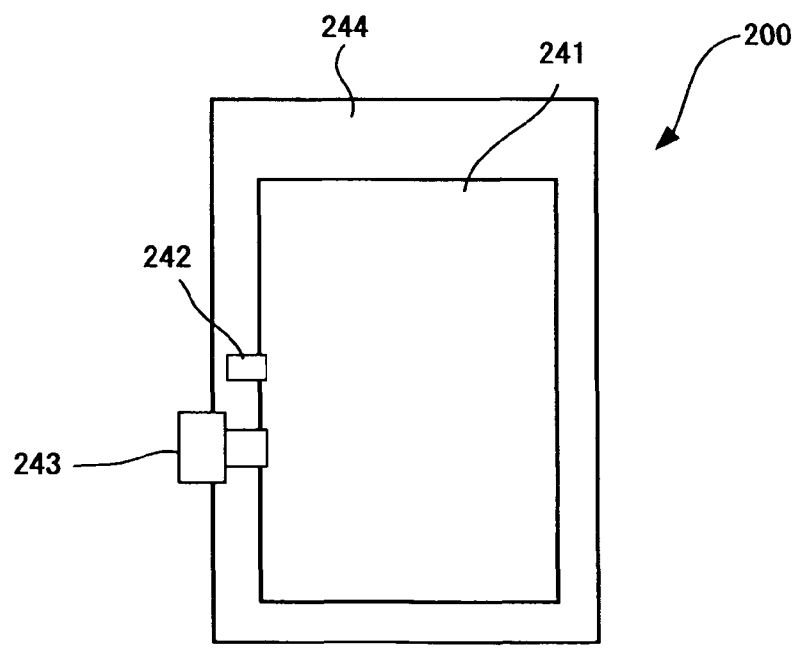
FIG. 4 is a schematic view showing an example of the ink cartridge containing the ink bag shown in FIG. 3 in a cartridge case.

As shown in FIG. 3, from an ink charging port 242 an ink bag 241 is filled with an ink and air is removed therefrom, and then the ink charging port 242 is closed by fusion bonding. When the ink cartridge is used, an ink discharge port 243 made from a rubber member is pierced with a needle of the apparatus body and the ink is supplied into the apparatus. The ink bag 241 is formed of a packaging material such as an aluminum laminated film that is gas impermeable. As shown in FIG. 4, the ink bag 241 is usually contained inside a plastic cartridge case 244, thereby forming the ink cartridge 200 and the ink cartridge 200 can be detachably mounted on various inkjet recording apparatuses.

The ink cartridge used in the present invention can be particularly advantageously used by being detachably mounted on the above-described inkjet recording apparatus of the present invention.

EXAMPLES

Hereinafter, the present invention will be further described in detail with reference to Examples and Comparative Example, however, the present invention is not limited to the disclosed Examples. All parts are by mass unless indicated otherwise.

Each pigment dispersion is prepared as described below.

<Pigment Dispersion K1>

An acidic carbon black (MONARCH 1300, manufactured by Cabot Corporation) (300 g) was sufficiently mixed in 1,000 g of water, and then 450 g of sodium hypochlorite (effective chloride concentration: 12 mole %) was dropped therein, and stirred at 100° C. to 105° C. for 8 hours.

Next, in this liquid, 100 g of sodium hypochlorite (effective chloride concentration: 12 mole %) was further added, and dispersed at 2,000 rpm for 2 hours using DYNO-MILL KDL A (manufactured by WAB) in which 0.5 mm-diameter zirconia beads were filled.

Next, the obtained slurry was diluted 10-fold with water, and its pH was adjusted with lithium hydroxide, and then the slurry was desalted and concentrated using an ultrafiltration membrane until an electric conductivity thereof was 0.2 mS/cm.

Then, coarse, large particles were removed by centrifugation, and the liquid was filtered using a 1 μm nylon filter to obtain a black pigment dispersion K1 having a pigment concentration of 15% by mass.

<Pigment Dispersion C1>

A cyan pigment dispersion C1 having a pigment concentration of 15% by mass was obtained in the same manner as in the pigment dispersion K1, except that the pigment was replaced with C. I. Pigment Blue 15:3 (HELIOGEN Blue D7079, manufactured by BASF Japan LTD.).

<Pigment Dispersion M1>

| Dispersion Material | |
|---|---|
| C. I. Pigment Violet 19 (CINQUASIA PACIFIC Red 2020, manufactured by Ciba Specialty Chemicals) | 15.0 parts |
| dispersant expressed by Structural Formula (5) | 5.0 parts |
| 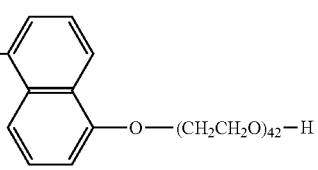 Structural Formula (5) | |
| ion-exchanged water | 80.0 parts |

The dispersant expressed by Structural Formula (5) was added and dissolved in water, and the pigment was mixed therein and stirred so as to be sufficiently wet, and then the mixture was kneaded at 2,000 rpm for 60 minutes using DYNO-MILL KDL A (manufactured by WAB) in which 0.5 mm-diameter zirconia beads were filled. Next, a mill base was taken out and filtered using a 1 μm filter to obtain a magenta pigment dispersion M1.

<Pigment Dispersion Y1>

| Dispersion Material | |
|---|---|
| C. I. Pigment Yellow 155 (TONER YELLOW 3GP, manufactured by Clariant (Japan) K.K.) | 15.0 parts |
| dispersant expressed by Structural Formula (6) | 5.0 parts |

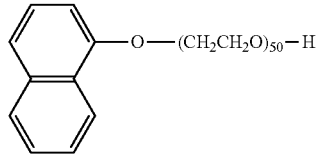

Structural Formula (6)

| | |
|---|---|
| ion-exchanged water | 80.0 parts |

A yellow pigment dispersion Y1 having a pigment concentration of 15% by mass was obtained in the same manner as in the pigment dispersion M1, provided that the above-described pigment and dispersant were respectively used as the pigment and the dispersant.

<Pigment Dispersion K2>

| Dispersion Material | |
|---|---|
| carbon black (NiPex150, manufactured by Degussa) | 15.0 parts |
| sodium alkyl naphthalene sulfonate (PELEX NB-L, manufactured by Kao Corporation) | 15.0 parts |
| ion-exchanged water | 70.0 parts |

A black pigment dispersion K2 having a pigment concentration of 15% by mass was obtained in the same manner as in the pigment dispersion M1, provided that the above-described pigment and dispersant were respectively used as the pigment and the dispersant.

<Pigment Dispersion M2>

A magenta pigment dispersion M2 having a pigment concentration of 15% by mass was obtained in the same manner as in the pigment dispersion Y1, except that the pigment was replaced with C. I. Pigment Red 122 (Jet Magenta DMQ, manufactured by Ciba Specialty Chemicals).

<Pigment Dispersion C2>

A cyan pigment dispersion C2 having a pigment concentration of 15% by mass was obtained in the same manner as in the pigment dispersion Y1, except that the pigment was replaced with C. I. Pigment Blue 15:3 (HELIOGEN Blue D7079, manufactured by BASF Japan LTD.).

<Pigment Dispersion Y2>

| (1) Synthesis of Polymer A | |
|---|---|
| Raw Material for Polymer A | |
| glycidyl ester of VERSATIC acid 10 (CARDURA E-10P, manufactured by Hexion Specialty Chemicals, Inc.) | 10.0 parts |
| adipic acid | 27.0 parts |
| hexahydrophthalic anhydride | 42.0 parts |
| neopentyl glycol | 2.0 parts |
| trimethylolpropane | 26.0 parts |
| dibutyltin dioxide | 0.1 parts |

In a 2 L four-neck flask equipped with a dehydration tube, a thermometer, a nitrogen gas introducing tube, and a stirrer, the above materials were charged and the temperature thereof was raised to 180° C. for 3 hours with dehydration to perform dehydration condensation reaction, thereby obtaining Polymer A (polyester resin).

| (2) Production of Pigment Dispersion | |
|---|---|
| Dispersion Material | |
| C. I. Pigment Yellow 74 (HANSA Yellow 5GX01, manufactured by Clariant (Japan) K.K) | 12.0 parts |
| Polymer A | 15.0 parts |
| 2-amino-2-methyl-1,3-propanediol | 1.5 parts |
| ion-exchanged water | 72.0 parts |

A pigment dispersion was produced using the above materials. Specifically, 1.0 part of 2-amino-2-methyl-1,3-propanediol was added to Polymer A and the mixture was dissolved in water, then the pigment was mixed therein and sufficiently wetted, and the mixture was poured into a kneading device (DYNO-MILL KDL A, manufactured by WAB Co.), in which 0.5 mm-diameter zirconia beads were filled, and was kneaded at 2,000 rpm for 40 minutes.

Then, 3 parts of 1 N HCl was added and stirred in the obtained mill base, to which 400 parts of ion-exchanged water was further added and sufficiently stirred, then the mixture was separated into a pigment paste and water using a centrifugal separator, and the supernatant was removed.

After repeating these procedures several times, 0.5 parts of 2-amino-2-methyl-1,3-propanediol as a basic compound was added to the pigment paste, and the mixture was kneaded again using the DYNO-MILL KDL A (manufactured by WAB). The mill base was taken out and filtered using a 1 μm filter to obtain a yellow pigment dispersion Y2 having a pigment concentration of 15% by mass.

<Pigment Dispersion M3>

| (1) Synthesis of Polymer B | |
|---|---|
| Raw Material 1 for Polymer B | |
| styrene | 11.2 parts |
| acrylic acid | 2.8 parts |
| lauryl methacrylate | 12.0 parts |
| polyethylene glycol methacrylate | 4.0 parts |
| styrene macromer (AS-6, manufactured by TOAGOSEI CO., LTD.) | 4.0 parts |
| mercaptoethanol | 0.4 parts |

Inside of a 1 L flask equipped with a mechanical stirrer, a thermometer, a nitrogen gas introducing tube, a reflux pipe, and a dropping funnel was sufficiently purged with nitrogen. Then, the above raw material 1 was charged into the flask, and the temperature thereof was raised to 65° C.

| Raw Material 2 for Polymer B | |
|---|---|
| styrene | 100.8 parts |
| acrylic acid | 25.2 parts |
| lauryl methacrylate | 108.0 parts |
| polyethylene glycol methacrylate | 36.0 parts |
| hydroxyethyl methacrylate | 60.0 parts |
| styrene macromer (AS-6, manufactured by TOAGOSEI CO., LTD.) | 36.0 parts |
| mercaptoethanol | 3.6 parts |
| azobisdimethylvaleronitrile | 2.4 parts |
| methyl ethyl ketone | 18.0 parts |

Next, a mixture solution of the raw material 2 was dropped into the flask the contents of which had been heated for 2.5 hours.

Upon completion of dropwise addition, a mixed solution containing 0.8 parts of azobisdimethylvaleronitrile and 18.0 parts of methyl ethyl ketone was dropped into the flask for 0.5 hours, matured for 1 hour at a temperature of 65° C., and then 0.8 parts of azobisdimethylvaleronitrile was added and further matured for 1 hour.

Upon completion of reaction, 364.0 parts of methyl ethyl ketone was added to the flask, thereby obtaining 800 parts of a Polymer B solution having a concentration of 50% by mass.

A dispersion was produced by using the below-described materials containing the Polymer B solution. The pigment and the Polymer. B solution were sufficiently stirred, and then kneaded 20 times using a three-roll mill (NR-84A, manufactured by Noritake Co., Limited.). The obtained paste was put into 200 parts of ion-exchanged water, and the solution was sufficiently stirred. Thereafter, the methyl ethyl ketone and the water were removed by distillation using an evaporator, to thereby obtain a magenta pigment dispersion M3 having a pigment concentration of 15% by mass.

| Dispersion Material | |
|---|---|
| C. I. Pigment Red 122 (Jet Magenta DMQ, manufactured by Ciba Specialty Chemicals) | 26.0 parts |
| Polymer B solution | 28.0 parts |
| potassium hydroxide aqueous solution 1 mol/L | 13.6 parts |
| methyl ethyl ketone | 20.0 parts |
| ion-exchanged water | 30.0 parts |

<Pigment Dispersion C3>

A cyan pigment dispersion C3 having a pigment concentration of 15% by mass was obtained in the same manner as in the pigment dispersion M3, except that the pigment was replaced with C. I. Pigment Blue 15:3 (HELIOGEN Blue D7079, manufactured by BASF Japan LTD.).

Example 1

Ink Formula

| | |
|---|---|
| Direct Blue 199 (IRGASPERSE JET CYAN RL, manufactured by Ciba Specialty Chemicals) | 30.0 parts |
| surfactant A expressed by Structural Formula (2), | 0.2 parts |

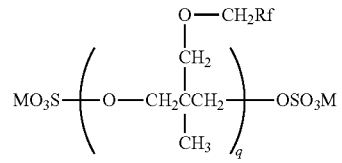

Structural Formula (2)

where Rf: —$CF_3$, M: ammonium, q = 6; solid content 30% (POLYFOX PF-136A, manufactured by OMNOVA Solutions Inc.)

| surfactant B expressed by Structural Formula (3), | 0.8 parts |
|---|---|

$$R^3\text{—CH—O—}[CH_2CH_2O]r\text{—}[CH_2CHO]s\text{—H}$$
$$\phantom{R^3\text{—}}|\phantom{CH\text{—O—}[CH_2CH_2O]r\text{—}[CH_2CH}|$$
$$\phantom{R^3\text{—}}R^4\phantom{CH\text{—O—}[CH_2CH_2O]r\text{—}[CH}CH_3$$

or $$R^3\text{—CH—O—}[CH_2CHO]t\text{—}[CH_2CH_2O]u\text{—H}$$
$$\phantom{R^3\text{—}}|\phantom{CH\text{—O—}[CH}|$$
$$\phantom{R^3\text{—}}R^4\phantom{CH\text{—O—}[}CH_3$$

Structural Formula (3)

where a sum of carbon atoms in $R^3$ and $R^4$ = 11 to 13, r = 5, s = 3.5 (SOFTANOL EP5035, manufactured by NIPPON SHOKUBAI CO., LTD.)

| glycerin | 10.0 parts |
|---|---|
| D-sorbitol | 10.0 parts |
| acrylic resin emulsion, solid content 24.5% (JONCRYL PDX-6102B, manufactured by BASF Japan Ltd.) | 2.0 parts |
| 2,2,4-trimethyl-1,3-pentanediol | 2.0 parts |
| lithium hydroxide | 0.1 parts |
| antiseptic/antifungal agent, PROXEL LV (manufactured by Avecia Co., Ltd.) | 0.1 parts |
| ion-exchanged water | 44.8 parts |

The above materials were dissolved in ion-exchanged water, and filtered using a 0.2 μm filter so as to obtain a cyan ink for inkjet recording.

Example 2

Ink Formula

| | |
|---|---|
| the pigment dispersion K1 | 50.0 parts |
| surfactant A expressed by Structural Formula (1), | 0.83 parts |

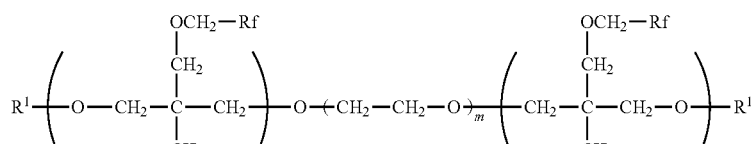

Structural Formula (1)

where $R^1$: H, Rf: —$CF_2CF_3$, m = 21, n = up to 4, p = up to 4;

solid content 50% (POLYFOX PF-151N, manufactured by OMNOVA Solutions Inc.)

| surfactant B expressed by Structural Formula (3), where a sum of carbon atoms in $R^3$ and $R^4$ = 11 to 13, r = 9, s = 5 | 0.17 parts |
|---|---|

| | |
|---|---|
| (SOFTANOL EP9050, manufactured by NIPPON SHOKUBAI CO., LTD) | |
| urea | 27.0 parts |
| styrene-acrylic resin emulsion, solid content 48% (JONCRYL7100, manufactured by BASF Japan LTD.) | 2.0 parts |
| 2,2,4-trimethyl-1,3-pentane diol | 2.0 parts |
| 2-amino-2-ethyl-1,3-propanediol | 0.2 parts |
| antiseptic/antifungal agent, PROXEL LV (manufactured by Avecia Co., Ltd.) | 0.1 parts |
| ion-exchanged water | 17.7 parts |

The above materials other than the pigment dispersion K1 were dissolved in the ion-exchanged water to produce a vehicle, and sufficiently stirred, and then mixed with the pigment dispersion K1. The mixture was filtered using a 1 μm filter so as to obtain a black ink for inkjet recording.

Example 3

Ink Formula

| | |
|---|---|
| the pigment dispersion C1 | 30.0 parts |
| surfactant A expressed by Structural Formula (2), where Rf: —$CF_3$, M: ammonium, q = 6; solid content 30% (POLYFOX PF-136A, manufactured by OMNOVA Solutions Inc.) | 0.3 parts |
| surfactant B expressed by Structural Formula (3), where $R^3$: an alkyl group having 9 carbon atoms, $R^4$: hydrogen, t = 2, u = 7, (EMALEXDAPE-0207, manufactured by NIHON EMULSION Co., Ltd.) | 1.2 parts |
| glycerin | 5.0 parts |
| propylene glycol | 15.0 parts |
| acrylic silicone resin emulsion (AP4710, manufactured by SHOWA HIGHPOLYMER CO., LTD.) | 3.0 parts |
| triethanolamine | 0.2 parts |
| antiseptic/antifungal agent (PROXEL LV, manufactured by Avecia Co., Ltd.) | 0.1 parts |
| ion-exchanged water | 45.2 parts |

The above materials other than the pigment dispersion C1 were dissolved in the ion-exchanged water to produce a vehicle, and sufficiently stirred, and then mixed with the pigment dispersion C1. The mixture was filtered using a 1 μm filter so as to obtain a cyan ink for inkjet recording.

Example 4

Ink Formula

| | |
|---|---|
| the pigment dispersion M1 | 50.0 parts |
| surfactant A expressed by Structural Formula (2), where Rf: —$CF_2CF_3$, M: ammonium, q = 6; solid content 30% (POLYFOX PF-156A, manufactured by OMNOVA Solutions Inc.) | 0.75 parts |
| surfactant B expressed by Structural Formula (3), where a sum of carbon atoms in $R^3$ and $R^4$ = 11 to 13, r = 7, s = 4.5 (SOFTANOL EP7045, manufactured by NIPPON SHOKUBAI CO., LTD) | 0.25 parts |
| glycerin | 7.0 parts |
| dipropylene glycol | 21.0 parts |
| 2-ethyl-1,3-hexanediol | 2.0 parts |
| urethane resin emulsion, solid content 30% (SUPERFLEX 110, manufactured by DAI-ICHI KOGYO SEIYAKU CO., LTD.) | 5.0 parts |
| lithium hydroxide | 0.2 parts |
| antiseptic/antifungal agent (PROXEL LV, manufactured by Avecia Co., Ltd.) | 0.1 parts |
| ion-exchanged water | 13.7 parts |

The above materials other than the pigment dispersion M1 were dissolved in the ion-exchanged water to produce a vehicle, and sufficiently stirred, and then mixed with the pigment dispersion M1. The mixture was filtered using a 1 μm filter so as to obtain a magenta ink for inkjet recording.

Example 5

Ink Formula

| | |
|---|---|
| the pigment dispersion Y1 | 30.0 parts |
| surfactant A expressed by Structural Formula (1), where $R^1$: H, Rf: —$CF_2CF_3$, m = 21, n = up to 4, p = up to 4; solid content 50% (POLYFOX PF-151N, manufactured by OMNOVA Solutions Inc.) | 0.4 parts |
| surfactant B expressed by Structural Formula (3), where a sum of carbon atoms in $R^3$ and $R^4$ = 11 to 13, r = 7, s = 2.5 (SOFTANOL EP7025, manufactured by NIPPON SHOKUBAI CO., LTD) | 1.1 parts |
| glycerin | 10.0 parts |
| tetramethylolpropane | 30.0 parts |
| urethane resin emulsion, solid content 35% (W-5661, manufactured by Mitsui Takeda Chemicals, Inc.) | 2.5 parts |
| styrene-acrylic resin emulsion, solid content 48% (JONCRYL 7100, manufactured by BASF Japan LTD.) | 8.0 parts |
| 2-amino-2-ethyl-1,3-propanediol | 0.2 parts |
| antiseptic/antifungal agent (PROXEL LV, manufactured by Avecia Co., Ltd.) | 0.1 parts |
| ion-exchanged water | 17.7 parts |

The above materials other than the pigment dispersion Y1 were dissolved in the ion-exchanged water to produce a vehicle, and sufficiently stirred, and then mixed with the pigment dispersion Y1. The mixture was filtered using a 1 μm filter so as to obtain a yellow ink for inkjet recording.

Example 6

Ink Formula

| | |
|---|---|
| the pigment dispersion K2 | 30.0 parts |
| surfactant A expressed by Structural Formula (1), where $R^1$: H, Rf: —$CF_2CF_3$, m = 21, n = up to 4, p = up to 4; solid content 50% (POLYFOX PF-151N, manufactured by OMNOVA Solutions Inc.) | 0.35 parts |
| surfactant B expressed by Structural Formula (3), where $R^3$: an alkyl group having 9 carbon atoms, $R^4$: hydrogen, t = 2, u = 10, (EMALEXDAPE-0210, manufactured by NIHON EMULSION Co., Ltd.) | 0.15 parts |

-continued

| | |
|---|---|
| glycerin | 14.0 parts |
| triethylene glycol | 14.0 parts |
| urethane resin emulsion, solid content 30% (SUPERFLEX110, manufactured by DAI-ICHI KOGYO SEIYAKU CO., LTD.) | 5.0 parts |
| 2-ethyl-1,3-hexanediol | 2.0 parts |
| triethanolamine | 0.2 parts |
| antiseptic/antifungal agent (PROXEL LV, manufactured by Avecia Co., Ltd.) | 0.1 parts |
| ion-exchanged water | 34.2 parts |

The above materials other than the pigment dispersion K2 were dissolved in the ion-exchanged water to produce a vehicle, and sufficiently stirred, and then mixed with the pigment dispersion K2. The mixture was filtered using a 1 μm filter so as to obtain a black ink for inkjet recording.

Example 7

Ink Formula

| | |
|---|---|
| the pigment dispersion M2 | 50.0 parts |
| surfactant A expressed by Structural Formula (2), where Rf: —CF$_2$CF$_3$, M: ammonium, q = 6; solid content 30% (POLYFOX PF-156A, manufactured by OMNOVA Solutions Inc.) | 0.2 parts |
| surfactant B expressed by Structural Formula (3), where a sum of carbon atoms in R$^3$ and R$^4$ = 11 to 13, r = 5, s = 3.5 (SOFTANOL EP5035, manufactured by NIPPON SHOKUBAI CO., LTD.) | 0.8 parts |
| glycerin | 15.0 parts |
| 3-methyl-1,3-butanediol | 15.0 parts |
| 2,2,4-trimethyl-1,3-pentanediol | 2.0 parts |
| urethane resin emulsion, solid content 35% (W-6061, manufactured by Mitsui Takeda Chemicals, Inc.) | 1.0 part |
| fluorine resin emulsion, solid content 50% (LUMIFLON FE4500, manufactured by ASAHI GLASS CO., LTD.) | 1.0 part |
| 2-amino-2-ethyl-1,3-propanediol | 0.2 parts |
| antiseptic/antifungal agent, PROXEL LV (manufactured by Avecia Co., Ltd.) | 0.1 parts |
| ion-exchanged water | 14.7 parts |

The above materials other than the pigment dispersion M2 were dissolved in the ion-exchanged water to produce a vehicle, and sufficiently stirred, and then mixed with the pigment dispersion M2. The mixture was filtered using a 1 μm filter so as to obtain a magenta ink for inkjet recording.

Example 8

Ink Formula

| | |
|---|---|
| the pigment dispersion C2 | 30.0 parts |
| surfactant A expressed by Structural Formula (2), where Rf: —CF$_3$, M: ammonium, q = 6; solid content 30% (POLYFOX PF-136A, manufactured by OMNOVA Solutions Inc.) | 0.6 parts |
| surfactant B expressed by Structural Formula (3), where a sum of carbon atoms in R$^3$ and R$^4$ = 11 to 13, r = 5, s = 3.5 (SOFTANOL EP5035, manufactured by NIPPON SHOKUBAI CO., LTD) | 0.4 parts |
| glycerin | 8.0 parts |
| diethylene glycol monobutyl ether | 24.0 parts |
| urethane resin emulsion, solid content 35% (W-5661, manufactured by Mitsui Takeda Chemicals, Inc.) | 2.5 parts |
| fluorine resin emulsion, solid content 50% (LUMIFLON FE4500, manufactured by ASAHI GLASS CO., LTD.) | 2.0 parts |
| 2-ethyl-1,3-hexanediol | 2.0 parts |
| triethanolamine | 0.2 parts |
| antiseptic/antifungal agent (PROXEL LV, manufactured by Avecia Co., Ltd.) | 0.1 parts |
| ion-exchanged water | 30.2 parts |

The above materials other than the pigment dispersion C2 were dissolved in the ion-exchanged water to produce a vehicle, and sufficiently stirred, and then mixed with the pigment dispersion C2. The mixture was filtered using a 1 μm filter so as to obtain a cyan ink for inkjet recording.

Example 9

Ink Formula

| | |
|---|---|
| the pigment dispersion Y2 | 30.0 parts |
| surfactant A expressed by Structural Formula (1), where R$^1$: H, Rf: —CF$_2$CF$_3$, m = 21, n = up to 4, p = up to 4; solid content 50% (POLYFOX PF-151N, manufactured by OMNOVA Solutions Inc.) | 0.25 parts |
| surfactant B expressed by Structural Formula (3), where R$^3$: an alkyl group having 9 carbon atoms, R$^4$: hydrogen, t = 2, u = 10, (EMALEXDAPE-0210, manufactured by NIHON EMULSION Co., Ltd.) | 0.25 parts |
| glycerin | 10.0 parts |
| 1,6-hexanediol | 15.0 parts |
| acrylic silicone resin emulsion, solid content 50% (AP4710, manufactured by SHOWA HIGHPOLYMER CO., LTD.) | 2.0 parts |
| 2,2,4-trimethyl-1,3-pentanediol | 2.0 parts |
| antiseptic/antifungal agent (PROXEL LV, manufactured by Avecia Co., Ltd.) | 0.1 parts |
| ion-exchanged water | 40.4 parts |

The above materials other than the pigment dispersion Y2 were dissolved in the ion-exchanged water to produce a vehicle, and sufficiently stirred, and then mixed with the pigment dispersion Y2. The mixture was filtered using a 1 μm filter so as to obtain a yellow ink for inkjet recording.

Example 10

Ink Formula

| | |
|---|---|
| the pigment dispersion M3 | 50.0 parts |
| surfactant A expressed by Structural Formula (2), where Rf: —CF$_3$, M: ammonium, q = 6; solid content 30% (POLYFOX PF-136A, manufactured by OMNOVA Solutions Inc.) | 0.1 parts |
| surfactant B expressed by Structural Formula (3), where a sum of carbon atoms in R$^3$ and R$^4$ = 11 to 13, r = 7, s = 2.5 (SOFTANOL EP7025, manufactured by NIPPON SHOKUBAI CO., LTD) | 0.9 parts |
| glycerin | 16.0 parts |
| 1,5-pentanediol | 16.0 parts |
| acrylic resin emulsion, solid content 24.5% (JONCRYL PDX-6102B, manufactured by BASF Japan LTD.) | 2.0 parts |
| 2-ethyl-1,3-hexanediol | 2.0 parts |
| 2-amino-2-ethyl-1,3-propanediol | 0.2 parts |
| antiseptic/antifungal agent (PROXEL LV, manufactured by Avecia Co., Ltd.) | 0.1 parts |
| ion-exchanged water | 12.7 parts |

The above materials other than the pigment dispersion M3 were dissolved in the ion-exchanged water to produce a vehicle, and sufficiently stirred, and then mixed with the pigment dispersion M3. The mixture was filtered using a 1 μM filter so as to obtain a magenta ink for inkjet recording.

Example 11

Ink Formula

| | |
|---|---|
| the pigment dispersion C3 | 30.0 parts |
| surfactant A expressed by Structural Formula (2), where Rf: —CF$_3$, M: ammonium, q = 6; solid content 30% (POLYFOX PF-136A, manufactured by OMNOVA Solutions Inc.) | 0.35 parts |
| surfactant B expressed by Structural Formula (3), where a sum of carbon atoms in R$^3$ and R$^4$ = 11 to 13, r = 5, s = 3.5 (SOFTANOL EP5035, manufactured by NIPPON SHOKUBAI CO., LTD.) | 0.65 parts |
| glycerin | 16.0 parts |
| 1,3-butanediol | 16.0 parts |
| 2-ethyl-1,3-hexanediol | 2.0 parts |
| acrylic silicone resin emulsion, solid content 50% (AP4710, manufactured by SHOWA HIGHPOLYMER CO., LTD.) | 2.0 parts |
| 2-amino-2-ethyl-1,3-propanediol | 0.2 parts |
| antiseptic/antifungal agent (PROXEL LV, manufactured by Avecia Co., Ltd.) | 0.1 parts |
| ion-exchanged water | 32.7 parts |

The above materials other than the pigment dispersion C3 were dissolved in the ion-exchanged water to produce a vehicle, and sufficiently stirred, and then mixed with the pigment dispersion C3. The mixture was filtered using a 1 μm filter so as to obtain a cyan ink for inkjet recording.

Comparative Example 1

A cyan ink for inkjet recording was obtained in the same manner as in Example 11, except that the surfactant A (POLYFOX PF-136A) of Example 11 was replaced with FTERGENT 110 (fluorine surfactant ($C_{12}H_4F_{11}$—O—SO$_3$Na), manufactured by Neos Company Limited.).

Comparative Example 2

A cyan ink for inkjet recording was obtained in the same manner as in Example 11, except that the surfactant A (POLYFOX PF-136A) of Example 11 was not added, and the amount of ion-exchanged water was increased by an amount equal to the surfactant A of Example 11.

Comparative Example 3

A black ink for inkjet recording was obtained in the same manner as in Example 2, except that the surfactant B (SOFTANOL EP9050) of Example 2 was replaced with polyoxyethylene alkylene derivative (TOC, manufactured by NOF Corporation, solid content 100%).

Comparative Example 4

A black ink for inkjet recording was obtained in the same manner as in Example 2, except that the surfactant B (SOFTANOL EP9050) of Example 2 was not added, and the amount of ion-exchanged water was increased by the amount equal to the surfactant B of Example 2.

Comparative Example 5

An yellow ink for inkjet recording was obtained in the same manner as in Example 9, except that EMALEX DAPE-0210 of Example 9 was replaced with 0.625 parts of ZONYL FS-300 (polyoxyethylene perfluoroalkyl ether, manufactured by DuPont, solid content 40%), and 40.4 parts of the ion-exchanged water was replaced with 40.025 parts of the ion-exchanged water.

Comparative Example 6

A yellow ink for inkjet recording was obtained in the same manner as in Example 9, except that EMALEX DAPE-0210 of Example 9 was replaced with ZONYL FSO-100 (polyoxyethylene perfluoroalkyl ether, manufactured by DuPont, solid content 100%).

Comparative Example 7

A magenta ink for inkjet recording was obtained in the same manner as in Example 7, except that SOFTANOL EP5035 of Example 7 was replaced with 3.2 parts of UNISAFE A-LY (aqueous solution of PEG-3 lauramide oxide, nonionic surfactant, solid content 25%, manufactured by NOF CORPORATION) and 14.7 parts of the ion-exchanged water was replaced with 12.3 parts of the ion-exchanged water.

Comparative Example 8

A magenta ink for inkjet recording was obtained in the same manner as in Example 7, except that SOFTANOL EP5035 of Example 7 was replaced with 2.3 parts of UNISAFE A-LM (aqueous solution of dimethyl lauryl-amine oxide, nonionic surfactant, solid content 35%, manufactured by NOF CORPORATION) and 14.7 parts of the ion-exchanged water was replaced with 13.2 parts of the ion-exchanged water.

Comparative Example 9

A yellow ink of inkjet recording was obtained in the same manner as in Example 9, except that EMALEX DAPE-0210 of Example 9 was replaced with NIKKOL ECTD-3NEX (sodium trideceth-4 carboxylate, anionic surfactant, solid content 98%, manufactured by Nikko Chemicals Co., Ltd.).

The ink compositions of above Examples are shown in Tables 2-1 to 2-2, and the ink compositions of above Comparative Examples are shown in Tables 2-3 to 2-4.

TABLE 2-1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Colorant | IRGASPERSE JET | | 30 | | | | | | | | | | |
| | K1 | | | 50 | | | | | | | | | |
| | C1 | | | | 30 | | | | | | | | |
| | M1 | | | | | | 50 | | | | | | |
| | Y1 | | | | | | | 30 | | | | | |

TABLE 2-1-continued

|  |  | Example |  |  |  |  |  |  |  |  |  |  |
|---|---|---|---|---|---|---|---|---|---|---|---|---|
|  |  | 1 | 2 | 3 | 4 | 5 | 6 | 7 | 8 | 9 | 10 | 11 |
|  | K2 |  |  |  |  |  | 30 |  |  |  |  |  |
|  | M2 |  |  |  |  |  |  | 50 |  |  |  |  |
|  | C2 |  |  |  |  |  |  |  | 30 |  |  |  |
|  | Y2 |  |  |  |  |  |  |  |  | 30 |  |  |
|  | M3 |  |  |  |  |  |  |  |  |  | 50 |  |
|  | C3 |  |  |  |  |  |  |  |  |  |  | 30 |
| Surfactant A | Structural Formula (2) POLYFOX PF-136A | 0.2 |  | 0.3 |  |  |  |  | 0.6 |  | 0.1 | 0.35 |
|  | Structural Formula (1) POLYFOX PF-151N |  | 0.83 |  |  | 0.4 | 0.35 |  |  | 0.25 |  |  |
|  | Structural Formula (2) POLYFOX PF-156A |  |  |  | 0.75 |  |  | 0.2 |  |  |  |  |
| Surfactant B | Structural Formula (3) SOFTANOL EP5035 | 0.8 |  |  |  |  |  | 0.8 | 0.4 |  |  | 0.65 |
|  | Structural Formula (3) SOFTANOL EP9050 |  | 0.17 |  |  |  |  |  |  |  |  |  |
|  | Structural Formula (3) EMALEXDAPE-0207 |  |  | 1.2 |  |  |  |  |  |  |  |  |
|  | Structural Formula (3) SOFTANOL EP7045 |  |  |  | 0.25 |  |  |  |  |  |  |  |
|  | Structural Formula (3) SOFTANOL EP7025 |  |  |  |  | 1.1 |  |  |  |  | 0.9 |  |
|  | Structural Formula (3) EMALEXDAPE-0210 |  |  |  |  |  | 0.15 |  |  | 0.25 |  |  |
| Surfactant | FTERGENT 110 |  |  |  |  |  |  |  |  |  |  |  |
|  | TOC |  |  |  |  |  |  |  |  |  |  |  |
|  | ZONYL FS-300 |  |  |  |  |  |  |  |  |  |  |  |
|  | ZONYL FSO-100 |  |  |  |  |  |  |  |  |  |  |  |
|  | UNISAFE A-LY |  |  |  |  |  |  |  |  |  |  |  |
|  | UNISAFE A-LM |  |  |  |  |  |  |  |  |  |  |  |
|  | NIKKOL ECTD-3NEX |  |  |  |  |  |  |  |  |  |  |  |

TABLE 2-2

|  |  | Example |  |  |  |  |  |  |  |  |  |  |
|---|---|---|---|---|---|---|---|---|---|---|---|---|
|  |  | 1 | 2 | 3 | 4 | 5 | 6 | 7 | 8 | 9 | 10 | 11 |
| water soluble organic solvent | glycerin | 10 |  | 5 | 7 | 10 | 14 | 15 | 8 | 10 | 16 | 16 |
|  | D-sorbitol | 10 |  |  |  |  |  |  |  |  |  |  |
|  | urea |  | 27 |  |  |  |  |  |  |  |  |  |
|  | propylene glycol |  |  | 15 |  |  |  |  |  |  |  |  |
|  | dipropylene glycol |  |  |  | 21 |  |  |  |  |  |  |  |
|  | tetramethylolpropane |  |  |  |  | 30 |  |  |  |  |  |  |
|  | triethylene glycol |  |  |  |  |  | 14 |  |  |  |  |  |
|  | 3-methyl-1,3-butanediol |  |  |  |  |  |  | 15 |  |  |  |  |
|  | diethylene glycol monobutyl ether |  |  |  |  |  |  |  | 24 |  |  |  |
|  | 1,6-hexanediol |  |  |  |  |  |  |  |  | 15 |  |  |
|  | 1,5-pentanediol |  |  |  |  |  |  |  |  |  | 16 |  |
|  | 1,3-butanediol |  |  |  |  |  |  |  |  |  |  | 16 |
| resin emulsion | acrylic resin JONCRYL PDX-6102B | 2 |  |  |  |  |  |  |  |  | 2 |  |
|  | styrene-acrylic resin JONCRYL7100 |  | 2 |  |  | 8 |  |  |  |  |  |  |
|  | acrylic silicone resin AP4710 |  |  | 3 |  |  |  |  |  | 2 |  | 2 |
|  | urethane resin SUPERFLEX110 |  |  |  | 5 |  | 5 |  |  |  |  |  |
|  | urethane resin W-5661 |  |  |  | 2.5 |  |  |  | 2.5 |  |  |  |
|  | urethane resin W-6061 |  |  |  |  |  |  | 1 |  |  |  |  |
|  | fluorine resin LUMIFLON FE4500 |  |  |  |  |  |  | 1 | 2 |  |  |  |
| penetrating agent | 2,2,4-trimethyl-1,3-pentanediol | 2 | 2 |  |  |  |  | 2 |  | 2 |  |  |
|  | 2-ethyl-1,3-hexanediol |  |  | 2 |  | 2 |  | 2 |  | 2 | 2 | 2 |
| pH adjusting agent | lithium hydroxide | 0.1 |  |  | 0.2 |  |  |  |  |  |  |  |
|  | 2-amino-2-ethyl-1,3-propanediol |  | 0.2 |  |  | 0.2 |  | 0.2 |  |  | 0.2 | 0.2 |
|  | triethanolamine |  |  | 0.2 |  |  | 0.2 |  | 0.2 | 0.2 |  |  |
| antiseptic/antifungal agent | PROXEL LV | 0.1 | 0.1 | 0.1 | 0.1 | 0.1 | 0.1 | 0.1 | 0.1 | 0.1 | 0.1 | 0.1 |
| ion-exchanged water |  | 44.8 | 17.7 | 45.2 | 13.7 | 17.7 | 34.2 | 14.7 | 30.2 | 40.4 | 12.7 | 32.7 |
| Total |  | 100 | 100 | 100 | 100 | 100 | 100 | 100 | 100 | 100 | 100 | 100 |

TABLE 2-3

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Colorant | IRGASPERSE JET |  |  |  |  |  |  |  |  |  |
|  | K1 |  |  | 50 | 50 |  |  |  |  |  |
|  | C1 |  |  |  |  |  |  |  |  |  |
|  | M1 |  |  |  |  |  |  |  |  |  |
|  | Y1 |  |  |  |  |  |  |  |  |  |
|  | K2 |  |  |  |  |  |  |  |  |  |
|  | M2 |  |  |  |  |  |  | 50 | 50 |  |
|  | C2 |  |  |  |  |  |  |  |  |  |
|  | Y2 |  |  |  |  | 30 | 30 |  |  | 30 |
|  | M3 |  |  |  |  |  |  |  |  |  |
|  | C3 | 30 | 30 |  |  |  |  |  |  |  |
| Surfactant A | Structural Formula (2) POLYFOX PF-136A |  |  |  |  |  |  |  |  |  |
|  | Structural Formula (1) POLYFOX PF-151N |  |  | 0.83 | 0.83 | 0.25 | 0.25 |  |  | 0.25 |
|  | Structural Formula (2) POLYFOX PF-156A |  |  |  |  |  |  | 0.2 | 0.2 |  |
| Surfactant B | Structural Formula (3) SOFTANOL EP5035 | 0.65 | 0.65 |  |  |  |  |  |  |  |
|  | Structural Formula (3) SOFTANOL EP9050 |  |  |  |  |  |  |  |  |  |
|  | Structural Formula (3) EMALEXDAPE-0207 |  |  |  |  |  |  |  |  |  |
|  | Structural Formula (3) SOFTANOL EP7045 |  |  |  |  |  |  |  |  |  |
|  | Structural Formula (3) SOFTANOL EP7025 |  |  |  |  |  |  |  |  |  |
|  | Structural Formula (3) EMALEXDAPE-0210 |  |  |  |  |  |  |  |  |  |
| Surfactant | FTERGENT 110 | 0.35 |  |  |  |  |  |  |  |  |
|  | TOC |  |  | 0.17 |  |  |  |  |  |  |
|  | ZONYL FS-300 |  |  |  |  | 0.625 |  |  |  |  |
|  | ZONYL FSO-100 |  |  |  |  |  | 0.25 |  |  |  |
|  | UNISAFE A-LY |  |  |  |  |  |  | 3.2 |  |  |
|  | UNISAFE A-LM |  |  |  |  |  |  |  | 2.3 |  |
|  | NIKKOL ECTD-3NEX |  |  |  |  |  |  |  |  | 0.25 |

TABLE 2-4

|  |  | Comparative Example | | | | | | | | |
|---|---|---|---|---|---|---|---|---|---|---|
|  |  | 1 | 2 | 3 | 4 | 5 | 6 | 7 | 8 | 9 |
| water soluble organic solvent | glycerin | 16 | 16 |  |  |  |  |  |  |  |
|  | D-sorbitol |  |  |  |  |  |  |  |  |  |
|  | urea |  |  | 27 | 27 |  |  |  |  |  |
|  | propylene glycol |  |  |  |  |  |  |  |  |  |
|  | dipropylene glycol |  |  |  |  |  |  |  |  |  |
|  | tetramethylolpropane |  |  |  |  |  |  |  |  |  |
|  | triethylene glycol |  |  |  |  |  |  |  |  |  |
|  | 3-methyl-1,3-butanediol |  |  |  |  |  |  | 15 | 15 |  |
|  | diethylene glycol monobutyl ether |  |  |  |  |  |  |  |  |  |
|  | 1,6-hexanediol |  |  |  |  | 15 | 15 |  |  | 15 |
|  | 1,5-pentanediol |  |  |  |  |  |  |  |  |  |
|  | 1,3-butanediol | 16 | 16 |  |  |  |  |  |  |  |
| resin emulsion | acrylic resin JONCRYL PDX-6102B |  |  |  |  |  |  |  |  |  |
|  | styrene-acrylic resin JONCRYL7100 |  |  | 2 | 2 |  |  |  |  |  |
|  | acrylic silicone resin AP4710 | 2 | 2 |  |  | 2 | 2 |  |  | 2 |
|  | urethane resin SUPERFLEX110 |  |  |  |  |  |  |  |  |  |
|  | urethane resin W-5661 |  |  |  |  |  |  |  |  |  |
|  | urethane resin W-6061 |  |  |  |  |  |  | 1 | 1 |  |
|  | fluorine resin LUMIFLON FE4500 |  |  |  |  |  |  | 1 | 1 |  |
| penetrating agent | 2,2,4-trimethyl-1,3-pentanediol |  |  | 2 | 2 | 2 | 2 | 2 | 2 | 2 |
|  | 2-ethyl-1,3-hexanediol | 2 | 2 |  |  |  |  |  |  |  |
| pH adjusting agent | lithium hydroxide |  |  |  |  |  |  |  |  |  |
|  | 2-amino-2-ethyl-1,3-propanediol | 0.2 | 0.2 | 0.2 | 0.2 |  |  | 0.2 | 0.2 |  |
|  | triethanolamine |  |  |  |  |  |  |  |  |  |
| antiseptic/antifungal agent | PROXEL LV | 0.1 | 0.1 | 0.1 | 0.1 |  |  |  |  |  |
| ion-exchanged water |  | 32.7 | 33.05 | 17.7 | 17.87 | 40.025 | 40.4 | 12.3 | 13.2 | 40.4 |
| Total |  | 100 | 100 | 100 | 100 | 100 | 100 | 100 | 100 | 100 |

The physical properties of respective inks of Examples and Comparative Examples were measured as described below. The results are shown in Table 3.

(1) Viscosity

The viscosity was measured using RC-500 (by Toki Sangyo Co. Ltd.) at 25° C.

The viscosity of each inkjet recording ink was measured immediately after the inkjet recording ink was produced (beginning), and after the inkjet recording ink was left to stand for 1 month at 50° C. (with time), in Examples and Comparative Examples. The percentage change of the viscosity (%) of each inkjet recording ink is shown in Table 3.

The percentage change within the range of ±10% was regarded as excellent in the storage stability. The percentage change out of the range of ±10% was regarded as poor in the storage stability.

(2) Surface Tension

The surface tension of the inkjet recording ink immediately after production (beginning) was measured at 25° C. using Model CBVP-Z (manufactured by Kyowa Interface Science Co., Ltd.).

(3) pH

The pH of the inkjet recording ink immediately after production (beginning) was measured at 25° C. using pH BOY-P2 (manufactured by Shindengen Electric Mfg. Co. Ltd.).

TABLE 3

| Ink | Viscosity (mPa·s) beginning | Viscosity (mPa·s) with time | percentage change | Surface Tension (mN/m) | pH |
|---|---|---|---|---|---|
| Example 1 | 4.7 | 5.0 | 6.4% | 28.1 | 8.4 |
| Example 2 | 5.4 | 5.2 | −3.8% | 24.5 | 8.8 |
| Example 3 | 5.8 | 6.3 | 8.9% | 23.8 | 7.5 |
| Example 4 | 10.2 | 10.6 | 3.7% | 25.4 | 11.2 |
| Example 5 | 30.1 | 28.9 | −3.7% | 26.0 | 7.9 |
| Example 6 | 7.7 | 7.5 | −2.9% | 35.5 | 8.1 |
| Example 7 | 8.6 | 8.8 | 1.8% | 27.1 | 9.6 |
| Example 8 | 12.3 | 12.1 | −1.5% | 25.9 | 8.5 |
| Example 9 | 6.1 | 6.4 | 5.3% | 30.2 | 6.8 |
| Example 10 | 7.4 | 7.5 | 1.3% | 28.4 | 8.8 |
| Example 11 | 8.0 | 8.2 | 1.9% | 26.8 | 9.2 |
| Comparative Example 1 | 7.8 | 8.4 | 7.6% | 24.2 | 8.5 |
| Comparative Example 2 | 7.5 | 7.8 | 4.4% | 29.9 | 8.9 |
| Comparative Example 3 | 6.4 | 8.2 | 28.4% | 27.5 | 8.4 |
| Comparative Example 4 | 5.8 | 9.3 | 60.3% | 26.7 | 8.1 |
| Comparative Example 5 | 6.7 | 6.6 | −1.2% | 25.2 | 7.1 |
| Comparative Example 6 | 6.4 | 6.6 | 2.1% | 24.8 | 7.4 |
| Comparative Example 7 | 9.3 | 10.2 | 9.8% | 27.9 | 8.8 |
| Comparative Example 8 | 9.1 | 9.6 | 5.5% | 27.5 | 9.2 |
| Comparative Example 9 | 7.9 | 8.7 | 10.2% | 28.9 | 8.0 |

A nozzle plate of a printer head was produced by the following methods (a) or (b).

(a) On a polyimide film, (manufactured by DuPont, Kapton, without addition of particles), an $SiO_2$ film having a thickness of 10 Å (1 nm) was formed by sputtering, and then an ink repellent layer formed of a modified perfluoropolyoxethane OPTOOL DSX (manufactured by Daikin Industries, Ltd.) having a thickness of approximately 50 Å (5 nm) was formed by vacuum evaporation. Next, a nozzle hole was formed by an excimer laser process from the polyimide film side, thereby producing a nozzle plate.

(b) A silicone resin, SR2411 (manufactured by Dow Corning Toray Co., Ltd.) was applied on a surface of an electroformed Ni nozzle by a dispenser to form a silicone layer having a thickness of 1.2 μm. The silicone layer was formed in such a manner that firstly nozzle holes and the back surface of a nozzle plate were masked with a water soluble resin, the silicone layer was formed, and then the mask was removed therefrom. Subsequently, this was left to stand for 2 days at room temperature so as to cure, thereby producing a nozzle plate, on which an ink repellent layer was formed.

Each of the nozzle plates produced by the methods described in (a) and (b) was set in a printer (IPSIO G707, manufactured by Ricoh Company, Ltd.) having a configuration shown in FIGS. 1 and 2. Each inkjet recording ink produced in Examples and Comparative Examples was filled in an ink cartridge, and the saturation on plain paper, the ejection stability and the ink attachment to a nozzle surface were evaluated by the following methods.

The results are shown in Table 4. In Table 4, (a) means the case where the nozzle plate produced by the method (a) was used, and (b) means the case where the nozzle plate produced by the method (b) was used.

(1) Saturation

With the use of the following paper for evaluating recording (plain paper), and only the color inks of magenta, cyan and yellow, each solid image was printed by one pass, i.e. the black ink was not evaluated. After prints were dried, each L*a*b* value was measured using a reflective color spectroscopic colorimetry densitometer manufactured by X-Rite.

The ratio of the measured color saturation of a color image (an average value of three types of the test paper) to those of standard color (yellow: 91.34, magenta: 74.55, cyan: 62.82, Japan color ver. 2) was calculated and evaluated in accordance with the following criteria.

<Paper for Evaluating Recording>

MY PAPER (manufactured by NBS Ricoh Co, Ltd.)

MULTI ACE (manufactured by Fuji xerox office supply Co, Ltd.)

PB Paper (manufactured by Canon Inc.)

<Evaluation Criteria>

A: 0.9 or more

B: 0.8 or more and less than 0.9

C: less than 0.8

(2) Ejection Stability

By the use of the printer in which each of the nozzle plates produced by the above methods was set, the printing was continuously performed for 10 minutes, and a cap for wet retention was set in the state where an ink adhered to a head surface. The printer was left to stand for 1 month in an environment of 50° C. and 60% RH, and then cleaned so as to recover to the same state as that before being left to stand. Then, an interval printing test was performed under the following conditions, and then the ejection stability was evaluated.

The interval printing was performed in such manner that a pattern chart was continuously printed on 20 sheets and then rested for 20 minutes. This process was repeated 50 times. After 1,000 sheets were printed in total, another sheet was printed, and then a 5% solid image part in the chart of this sheet was visually evaluated whether or not lines, whiteout, or ejection disturbance were present in the solid image. The pattern was printed using a chart having a 5% print area of each color in whole area of a sheet surface with 100% duty of each color ink under the printing conditions of a recording density of 360 dpi and one pass printing. The evaluation criteria are as follows, and allowable level is only A.

[Evaluation Criteria]

A: No lines, whiteout, or ejection disturbance was observed in the solid image.

B: Lines, whiteout, or ejection disturbance was slightly observed in the solid image.

C: Lines, whiteout, or ejection disturbance was slightly observed all over the solid image.

(3) Ink Attachment to Nozzle Surface

The printer was placed in a constant temperature and humidity room, the temperature of the inside thereof was set at 32° C. and 30% RH. A pattern chart was continuously printed on 20 sheets and then rested for 20 minutes. This process was repeated 50 times and 1,000 sheets were printed in total, and then the nozzle plate was observed by a microscope and the presence or absence of ink attachment was evaluated.

The pattern was printed using a chart having a 5% print area of each color in whole area of a sheet surface with 100% duty of each color ink under the printing conditions of a recording density of 300 dpi and one pass printing.

The evaluation criteria are as follows, and allowable level is only A.

[Evaluation Criteria]
A: No attachment was found near the nozzle plate.
B: Attachment was found near the nozzle plate.
C: Attachment was found all over the nozzle plate.

of mercaptoethanol were charged into the flask, and the temperature thereof was raised to 65° C.

Then, a mixed solution containing 100.8 parts of styrene, 25.2 parts of acrylic acid, 108.0 parts of lauryl methacrylate, 36.0 parts of polyethylene glycol methacrylate, 60.0 parts of hydroxyethyl methacrylate, 36.0 parts of styrene macromer (trade name: AS-6, manufactured by To a Gosei Kabushiki Kaisha), 3.6 parts of mercaptoethanol, 2.4 parts of azobisdimethylvaleronitrile and 18 parts of methyl ethyl ketone was dropped into the flask for 2.5 hours.

Upon completion of dropwise addition, a mixed solution of 0.8 parts of azobisdimethylvaleronitrile and 18 parts of methyl ethyl ketone was dropped into the flask for 0.5 hours, matured for 1 hour at a temperature of 65° C., and then 0.8 parts of azobisdimethylvaleronitrile was added and further matured for 1 hour.

Upon completion of reaction, 364 parts of methyl ethyl ketone was added to the flask, and 800 parts of a polymer solution with a concentration of 50% by mass was obtained.

TABLE 4

| | Nozzle | | | | | |
| --- | --- | --- | --- | --- | --- | --- |
| | (a) | | | (b) | | |
| Ink | Saturation | Ejection stability | Attachment | Saturation | Ejection stability | Attachment |
| Example 1 | A | A | A | A | A | A |
| Example 2 | — | A | A | — | A | A |
| Example 3 | A | A | A | A | A | A |
| Example 4 | A | A | A | A | A | A |
| Example 5 | A | A | A | A | A | A |
| Example 6 | — | A | A | — | A | A |
| Example 7 | A | A | A | A | A | A |
| Example 8 | A | A | A | A | A | A |
| Example 9 | A | A | A | A | A | A |
| Example 10 | A | A | A | A | A | A |
| Example 11 | A | A | A | A | A | A |
| Comparative Example 1 | B | B | B | B | A | C |
| Comparative Example 2 | B | A | B | B | A | B |
| Comparative Example 3 | — | A | B | — | B | B |
| Comparative Example 4 | — | B | B | — | A | C |
| Comparative Example 5 | A | A | C | A | A | B |
| Comparative Example 6 | A | A | B | A | A | B |
| Comparative Example 7 | A | B | B | A | A | C |
| Comparative Example 8 | A | A | C | A | A | B |
| Comparative Example 9 | A | A | B | A | B | B |

Next, Examples and Comparative Examples with regard to inksets will be described.

<Method for Preparing Pigment Dispersion>

(1) Pigment Dispersion 1

—Method for Preparing Polymer Dispersion Solution—

Inside of a 1 L flask equipped with a mechanical stirrer, a thermometer, a nitrogen gas introducing tube, a reflux pipe, and a dropping funnel was sufficiently purged with nitrogen. Then, 11.2 parts of styrene, 2.8 parts of acrylic acid, 12.0 parts of lauryl methacrylate, 4.0 parts of polyethylene glycol methacrylate, 4.0 parts of styrene macromer (trade name: AS-6, manufactured by To a Gosei Kabushiki Kaisha), and 0.4 parts —Production of Carbon Black Pigment Dispersion—

The polymer solution (28 parts), 26 parts of a carbon black pigment (FW100, manufactured by Degussa), 13.6 parts of 1 mol/L potassium hydroxide solution, 20 parts of methyl ethyl ketone and 30 parts of ion-exchanged water were sufficiently stirred, and then kneaded using a three-roll mill. The paste obtained was put into 200 parts of ion-exchanged water, and the solution was sufficiently stirred; thereafter, the methyl ethyl ketone and the water were removed by distillation using an evaporator, to thereby obtain a black pigment dispersion.

(2) Pigment Dispersion 2

A cyan pigment dispersion was obtained in the same manner as in (1) Pigment Dispersion 1, except that the carbon black pigment of (1) Pigment Dispersion 1 was replaced with C. I. Pigment Blue 15:3.
(3) Pigment Dispersion 3
A magenta pigment dispersion was obtained in the same manner as in (1) Pigment Dispersion 1, except that the carbon black pigment of (1) Pigment Dispersion 1 was replaced with C. I. Pigment Red 122.
(4) Pigment Dispersion 4
A yellow pigment dispersion was obtained in the same manner as in (1) Pigment Dispersion 1, except that the carbon black pigment of (1) Pigment Dispersion 1 was replaced with C. I. Pigment Yellow 74.
(5) Pigment Dispersion 5

| | |
|---|---|
| carbon black pigment (FW100) manufactured by Degussa) | 15% by mass |
| compound expressed by Structural Formula (4), 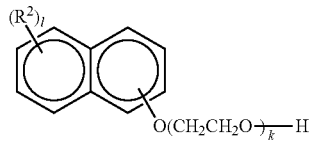 Structural Formula (4) where l = 0; and k = 40. | 3% by mass |
| purified water | 82% by mass |

These materials were premixed, and then circulated and dispersed using a disc-type bead mill (Model KDL, manufactured by Shinmaru Enterprises Corporation; zirconia balls having a diameter of 0.3 mm used as media), to thereby obtain a black pigment dispersion.
(6) Pigment Dispersion 6
A cyan pigment dispersion was obtained in the same manner as in (5) Pigment Dispersion 5, except that the carbon black pigment in (5) Pigment Dispersion 5 was replaced with C. I. Pigment Blue 15:3.
(7) Pigment Dispersion 7
A magenta pigment dispersion was obtained in the same manner as in (5) Pigment Dispersion 5, except that the carbon black pigment of (5) Pigment Dispersion 5 was replaced with C. I. Pigment Red 122.
(8) Pigment Dispersion 8
A yellow pigment dispersion was obtained in the same manner as in (5) Pigment Dispersion 5, except that the carbon black pigment of (5) Pigment Dispersion 5 was replaced with C. I. Pigment Yellow 74.

Ink Production

Production Examples 1 to 52

Each of the pigment dispersions and other materials shown in Tables 5-1 to 5-5 were mixed and stirred for 1.5 hours, and filtered through a membrane filter having an average pore size of 0.8 μm to thereby prepare each of inks of production examples 1 to 52. The ink was blended in the order of a water soluble organic solvent, a surfactant, a penetrating agent, and ion-exchanged water, and these were mixed and stirred for 30 minutes, and then a pigment dispersion, a resin emulsion, and an anti-foaming agent were added thereto, and the ink preparation solution was further mixed and stirred for 1 hour.

Each of the amounts of the pigment dispersions and other materials, and each of the ratios of the surfactant B to the surfactant A are as shown in Tables 5-1 to 5-5.

In Tables 5-1 to 5-5, the resin emulsion "AP4710" is manufactured by SHOWA HIGHPOLYMER CO., LTD., and "W6061" is manufactured by Mitsui Takeda Chemicals, Inc. and the anti-foaming agent "KM-90" is manufactured by Shin-Etsu Chemical Co., Ltd.

Examples 12 to 19 and Comparative Examples 10 to 14

The color bleeding and the ejection stability of each inkset containing the combinations of the black ink and color inks produced as described above of Examples and Comparative Examples shown in Tables 5-1 to 5-5, were evaluated as follows:
<Evaluation of Color Bleeding>
Each inkset was set in a printer, IPSIO GX3000 manufactured by Ricoh Company, Ltd., and then an image was printed on Ricoh Business Coat Gloss 100 using the printer. The bleeding in the boundary between the black ink and the color ink in each of obtained images was visually observed and evaluated based on the following criteria.
[Evaluation Criteria]
A: No bleeding was observed in the boundary between the black ink and the color ink and an image was sharp.
B: Slight bleeding was observed in the boundary between the black ink and the color ink and an image was slightly inferior in sharpness.
C: Serious bleeding was observed in the boundary between the black ink and the color ink and an image was not sharp.
<Evaluation of Ejection Stability>
Each inkset was set in the printer, IPSIO GX3000 manufactured by Ricoh Company, Ltd. and a chart having 5% of a print area of each color was continuously printed on 20 sheets and then rested for 10 minutes. This process was defined as one cycle. Ten cycles were performed in total, and the ejection disturbance and ejection failure were evaluated based on the following criteria.
[Evaluation Criteria]
A: Disturbance and ejection failure were observed in less than 5 nozzles.
B: Disturbance and ejection failure were observed in 5 nozzles or more and less than 15 nozzles.
C: Disturbance and ejection failure were observed in 15 nozzles or more.

TABLE 5-1

| | Example 12 | | | | Example 13 | | | | Example 14 | | | |
|---|---|---|---|---|---|---|---|---|---|---|---|---|
| | Produc. Ex. 1 | Produc. Ex. 2 | Produc. Ex. 3 | Produc. Ex. 4 | Produc. Ex. 5 | Produc. Ex. 6 | Produc. Ex. 7 | Produc. Ex. 8 | Produc. Ex. 9 | Produc. Ex. 10 | Produc. Ex. 11 | Produc. Ex. 12 |
| Pigment dispersion 1 (solid content) | 8 | | | | 8 | | | | | | | |
| Pigment dispersion 2 (solid content) | | 6 | | | | 6 | | | | | | |

TABLE 5-1-continued

|  |  | Example 12 | | | | Example 13 | | | | Example 14 | | | |
| --- | --- | --- | --- | --- | --- | --- | --- | --- | --- | --- | --- | --- | --- |
|  |  | Produc. Ex. 1 | Produc. Ex. 2 | Produc. Ex. 3 | Produc. Ex. 4 | Produc. Ex. 5 | Produc. Ex. 6 | Produc. Ex. 7 | Produc. Ex. 8 | Produc. Ex. 9 | Produc. Ex. 10 | Produc. Ex. 11 | Produc. Ex. 12 |
| Pigment dispersion 3 (solid content) |  |  |  | 8 |  |  |  | 8 |  |  |  |  |  |
| Pigment dispersion 4 (solid content) |  |  |  |  | 6 |  |  |  | 6 |  |  |  |  |
| Pigment dispersion 5 (solid content) |  |  |  |  |  |  |  |  |  |  | 8 |  |  |
| Pigment dispersion 6 (solid content) |  |  |  |  |  |  |  |  |  |  |  | 6 |  |
| Pigment dispersion 7 (solid content) |  |  |  |  |  |  |  |  |  |  |  |  | 8 |
| Pigment dispersion 8 (solid content) |  |  |  |  |  |  |  |  |  |  |  |  | 6 |
| Surfactant A expressed by Structural Formula (1) PF151N (solid content) |  | 0.40 | 0.50 | 0.50 | 0.50 | 0.10 | 0.30 | 0.30 | 0.30 | 0.30 | 0.40 | 0.40 | 0.40 |
| Surfactant B expressed by Structural Formula (2) EP7025 (solid content) |  | 0.60 | 0.50 | 0.50 | 0.50 | 0.90 | 0.70 | 0.70 | 0.70 | 0.70 | 0.60 | 0.60 | 0.60 |
| Ratio of B to A "B/A" (active ingredient) |  | 6/4 | 5/5 | 5/5 | 5/5 | 9/1 | 7/3 | 7/3 | 7/3 | 7/3 | 6/4 | 6/4 | 6/4 |
| Total amount of A and B (active ingredient) |  | 1 | 1 | 1 | 1 | 1 | 1 | 1 | 1 | 1 | 1 | 1 | 1 |
| Water soluble organic solvent | glycerin | 10 | 10 | 10 | 10 | 10 | 10 | 10 | 10 | 10 | 10 | 10 | 10 |
|  | 1,3-butanediol |  | 20 | 20 | 20 |  | 20 | 20 | 20 |  | 20 | 20 | 20 |
|  | 2-methyl-2,4-pentanediol | 20 |  |  |  | 20 |  |  |  | 20 |  |  |  |
| Penetrating agent | 2,2,4-trimethyl-1,3-pentanediol | 2.0 | 2.0 | 2.0 | 2.0 | 2.0 | 2.0 | 2.0 | 2.0 | 2.0 | 2.0 | 2.0 | 2.0 |
| Resin emulsion | acrylic silicone resin AP4710 (solid content) | 1.5 | 1.5 | 1.5 | 1.5 | 1.5 | 1.5 | 1.5 | 1.5 | 1.5 | 1.5 | 1.5 | 1.5 |
|  | urethane resin W-6061 (solid content) |  |  |  |  |  |  |  |  | 1.0 | 1.0 | 1.0 | 1.0 |
| Anti-foaming agent | KM-90 | 0.1 | 0.1 | 0.1 | 0.1 | 0.1 | 0.1 | 0.1 | 0.1 | 0.1 | 0.1 | 0.1 | 0.1 |
| Purified water |  | balance | balance | balance | balance | balance | balance | balance | balance | balance | balance | balance | balance |
| Total |  | 100 | 100 | 100 | 100 | 100 | 100 | 100 | 100 | 100 | 100 | 100 | 100 |
| Color bleeding |  |  |  | A |  |  |  | A |  |  |  | A |  |
| Ejection stability |  |  |  | B |  |  |  | A |  |  |  | B |  |

Note:
Produc. Ex. means Production Example.

TABLE 5-2

|  | Example 15 | | | | Example 16 | | | | Example 17 | | | |
| --- | --- | --- | --- | --- | --- | --- | --- | --- | --- | --- | --- | --- |
|  | Produc. Ex. 13 | Produc. Ex. 14 | Produc. Ex. 15 | Produc. Ex. 16 | Produc. Ex. 17 | Produc. Ex. 18 | Produc. Ex. 19 | Produc. Ex. 20 | Produc. Ex. 21 | Produc. Ex. 22 | Produc. Ex. 23 | Produc. Ex. 24 |
| Pigment dispersion 1 (solid content) |  |  |  |  |  |  |  |  |  |  |  |  |
| Pigment dispersion 2 (solid content) |  |  |  |  |  |  |  |  |  |  |  |  |
| Pigment dispersion 3 (solid content) |  |  |  |  |  |  |  |  |  |  |  |  |
| Pigment dispersion 4 (solid content) |  |  |  |  |  |  |  |  |  |  |  |  |
| Pigment dispersion 5 (solid content) | 8 |  |  |  | 8 |  |  |  | 8 |  |  |  |
| Pigment dispersion 6 (solid content) |  | 6 |  |  |  | 6 |  |  |  | 6 |  |  |
| Pigment dispersion 7 (solid content) |  |  | 8 |  |  |  | 8 |  |  |  | 8 |  |
| Pigment dispersion 8 (solid content) |  |  |  | 6 |  |  |  | 6 |  |  |  | 6 |
| Surfactant A expressed by Structural Formula (1) PF151N (solid content) | 0.10 | 0.30 | 0.30 | 0.30 | 0.03 | 0.09 | 0.09 | 0.09 | 0.05 | 0.15 | 0.15 | 0.15 |

TABLE 5-2-continued

|  |  | Example 15 | | | | Example 16 | | | | Example 17 | | | |
| --- | --- | --- | --- | --- | --- | --- | --- | --- | --- | --- | --- | --- | --- |
|  |  | Produc. Ex. 13 | Produc. Ex. 14 | Produc. Ex. 15 | Produc. Ex. 16 | Produc. Ex. 17 | Produc. Ex. 18 | Produc. Ex. 19 | Produc. Ex. 20 | Produc. Ex. 21 | Produc. Ex. 22 | Produc. Ex. 23 | Produc. Ex. 24 |
| Surfactant B expressed by Structural Formula (2) EP7025 (solid content) | | 0.90 | 0.70 | 0.70 | 0.70 | 0.27 | 0.21 | 0.21 | 0.21 | 0.45 | 0.35 | 0.35 | 0.35 |
| Ratio of B to A "B/A" (active ingredient) | | 9/1 | 7/3 | 7/3 | 7/3 | 9/1 | 7/3 | 7/3 | 7/3 | 9/1 | 7/3 | 7/3 | 7/3 |
| Total amount of A and B (active ingredient) | | 1 | 1 | 1 | 1 | 0.3 | 0.3 | 0.3 | 0.3 | 0.5 | 0.5 | 0.5 | 0.5 |
| Water soluble organic solvent | glycerin | 10 | 10 | 10 | 10 | 10 | 10 | 10 | 10 | 10 | 10 | 10 | 10 |
|  | 1,3-butanediol |  | 20 | 20 | 20 |  | 20 | 20 | 20 |  | 20 | 20 | 20 |
|  | 2-methyl-2,4-pentanediol | 20 |  |  |  | 20 |  |  |  | 20 |  |  |  |
| Penetrating agent | 2,2,4-trimethyl-1,3-pentanediol | 2.0 | 2.0 | 2.0 | 2.0 | 2.0 | 2.0 | 2.0 | 2.0 | 2.0 | 2.0 | 2.0 | 2.0 |
| Resin emulsion | acrylic silicone resin AP4710 (solid content) | 1.5 | 1.5 | 1.5 | 1.5 | 1.5 | 1.5 | 1.5 | 1.5 | 1.5 | 1.5 | 1.5 | 1.5 |
|  | urethane resin W-6061 (solid content) | 1.0 | 1.0 | 1.0 | 1.0 | 1.0 | 1.0 | 1.0 | 1.0 | 1.0 | 1.0 | 1.0 | 1.0 |
| Anti-foaming agent | KM-90 | 0.1 | 0.1 | 0.1 | 0.1 | 0.1 | 0.1 | 0.1 | 0.1 | 0.1 | 0.1 | 0.1 | 0.1 |
| Purified water | | balance | balance | balance | balance | balance | balance | balance | balance | balance | balance | balance | balance |
| Total | | 100 | 100 | 100 | 100 | 100 | 100 | 100 | 100 | 100 | 100 | 100 | 100 |
| Color bleeding | |  | A |  |  |  | B |  |  |  | A |  |  |
| Ejection stability | |  | A |  |  |  | A |  |  |  | A |  |  |

Note:
Produc. Ex. means Production Example.

TABLE 5-3

|  |  | Example 18 | | | | Example 19 | | | |
| --- | --- | --- | --- | --- | --- | --- | --- | --- | --- |
|  |  | Produc. Ex. 25 | Produc. Ex. 26 | Produc. Ex. 27 | Produc. Ex. 28 | Produc. Ex. 29 | Produc. Ex. 30 | Produc. Ex. 31 | Produc. Ex. 32 |
| Pigment dispersion 1 (solid content) | |  |  |  |  |  |  |  |  |
| Pigment dispersion 2 (solid content) | |  |  |  |  |  |  |  |  |
| Pigment dispersion 3 (solid content) | |  |  |  |  |  |  |  |  |
| Pigment dispersion 4 (solid content) | |  |  |  |  |  |  |  |  |
| Pigment dispersion 5 (solid content) | | 8 |  |  |  | 8 |  |  |  |
| Pigment dispersion 6 (solid content) | |  | 6 |  |  |  | 6 |  |  |
| Pigment dispersion 7 (solid content) | |  |  | 8 |  |  |  | 8 |  |
| Pigment dispersion 8 (solid content) | |  |  |  | 6 |  |  |  | 6 |
| Surfactant A expressed by Structural Formula (1) PF151N (solid content) | | 0.15 | 0.45 | 0.45 | 0.45 | 0.20 | 0.60 | 0.60 | 0.60 |
| Surfactant B expressed by Structural Formula (2) EP7025 (solid content) | | 1.35 | 1.05 | 1.05 | 1.05 | 1.80 | 1.40 | 1.40 | 1.40 |
| Ratio of B to A "B/A" (active ingredient) | | 9/1 | 7/3 | 7/3 | 7/3 | 9/1 | 7/3 | 7/3 | 7/3 |
| Total amount of A and B (active ingredient) | | 1.5 | 1.5 | 1.5 | 1.5 | 2 | 2 | 2 | 2 |
| Water soluble organic solvent | glycerin | 10 | 10 | 10 | 10 | 10 | 10 | 10 | 10 |
|  | 1,3-butanediol |  | 20 | 20 | 20 |  | 20 | 20 | 20 |
|  | 2-methyl-2,4-pentanediol | 20 |  |  |  | 20 |  |  |  |
| Penetrating agent | 2,2,4-trimethyl-1,3-pentanediol | 2.0 | 2.0 | 2.0 | 2.0 | 2.0 | 2.0 | 2.0 | 2.0 |
| Resin emulsion | acrylic silicone resin AP4710 (solid content) | 1.5 | 1.5 | 1.5 | 1.5 | 1.5 | 1.5 | 1.5 | 1.5 |
|  | urethane resin W-6061 (solid content) | 1.0 | 1.0 | 1.0 | 1.0 | 1.0 | 1.0 | 1.0 | 1.0 |
| Anti-foaming agent | KM-90 | 0.1 | 0.1 | 0.1 | 0.1 | 0.1 | 0.1 | 0.1 | 0.1 |
| Purified water | | balance | balance | balance | balance | balance | balance | balance | balance |
| Total | | 100 | 100 | 100 | 100 | 100 | 100 | 100 | 100 |
| Color bleeding | |  | A |  |  |  | A |  |  |
| Ejection stability | |  | A |  |  |  | B |  |  |

Note:
Produc. Ex. means Production Example.

TABLE 5-4

|  | Comparative Example 10 | | | | Comparative Example 11 | | | | Comparative Example 12 | | | |
| --- | --- | --- | --- | --- | --- | --- | --- | --- | --- | --- | --- | --- |
|  | Produc. Ex. 33 | Produc. Ex. 34 | Produc. Ex. 35 | Produc. Ex. 36 | Produc. Ex. 37 | Produc. Ex. 38 | Produc. Ex. 39 | Produc. Ex. 40 | Produc. Ex. 41 | Produc. Ex. 42 | Produc. Ex. 43 | Produc. Ex. 44 |
| Pigment dispersion 1 (solid content) | 8 | | | | | | | | | | | |
| Pigment dispersion 2 (solid content) | | 6 | | | | | | | | | | |
| Pigment dispersion 3 (solid content) | | | 8 | | | | | | | | | |
| Pigment dispersion 4 (solid content) | | | | 6 | | | | | | | | |
| Pigment dispersion 5 (solid content) | | | | | 8 | | | | 8 | | | |
| Pigment dispersion 6 (solid content) | | | | | | 6 | | | | 6 | | |
| Pigment dispersion 7 (solid content) | | | | | | | 8 | | | | 8 | |
| Pigment dispersion 8 (solid content) | | | | | | | | 6 | | | | 6 |
| Surfactant A expressed by Structural Formula (1) PF151N (solid content) | 0.40 | 0.30 | 0.30 | 0.30 | 1.00 | 1.00 | 1.00 | 1.00 | | | | |
| Surfactant B expressed by Structural Formula (2) EP7025 (solid content) | 0.60 | 0.70 | 0.70 | 0.70 | | | | | 1.00 | 1.00 | 1.00 | 1.00 |
| Ratio of B to A "B/A" (active ingredient) | 6/4 | 7/3 | 7/3 | 7/3 | — | — | — | — | — | — | — | — |
| Total amount of A and B (active ingredient) | 1 | 1 | 1 | 1 | 1 | 1 | 1 | 1 | 1 | 1 | 1 | 1 |
| Water soluble organic solvent  glycerin | 10 | 10 | 10 | 10 | 10 | 10 | 10 | 10 | 10 | 10 | 10 | 10 |
| 1,3-butanediol | | 20 | 20 | 20 | | 20 | 20 | 20 | | 20 | 20 | 20 |
| 2-methyl-2,4-pentanediol | 20 | | | | 20 | | | | 20 | | | |
| Penetrating agent  2,2,4-trimethyl-1,3-pentanediol | 2.0 | 2.0 | 2.0 | 2.0 | 2.0 | 2.0 | 2.0 | 2.0 | 2.0 | 2.0 | 2.0 | 2.0 |
| Resin emulsion  acrylic silicone resin AP4710 (solid content) | 1.5 | 1.5 | 1.5 | 1.5 | 1.5 | 1.5 | 1.5 | 1.5 | 1.5 | 1.5 | 1.5 | 1.5 |
| urethane resin W-6061 (solid content) | | | | | 1.0 | 1.0 | 1.0 | 1.0 | 1.0 | 1.0 | 1.0 | 1.0 |
| Anti-foaming agent  KM-90 | 0.1 | 0.1 | 0.1 | 0.1 | 0.1 | 0.1 | 0.1 | 0.1 | 0.1 | 0.1 | 0.1 | 0.1 |
| Purified water | balance | balance | balance | balance | balance | balance | balance | balance | balance | balance | balance | balance |
| Total | 100 | 100 | 100 | 100 | 100 | 100 | 100 | 100 | 100 | 100 | 100 | 100 |
| Color bleeding | | | C | | | | A | | | | C | |
| Ejection stability | | | A | | | | C | | | | A | |

Note:
Produc. Ex. means Production Example.

TABLE 5-5

|  | Comparative Example 13 | | | | Comparative Example 14 | | | |
| --- | --- | --- | --- | --- | --- | --- | --- | --- |
|  | Produc. Ex. 45 | Produc. Ex. 46 | Produc. Ex. 47 | Produc. Ex. 48 | Produc. Ex. 49 | Produc. Ex. 50 | Produc. Ex. 51 | Produc. Ex. 52 |
| Pigment dispersion 1 (solid content) | | | | | | | | |
| Pigment dispersion 2 (solid content) | | | | | | | | |
| Pigment dispersion 3 (solid content) | | | | | | | | |
| Pigment dispersion 4 (solid content) | | | | | | | | |
| Pigment dispersion 5 (solid content) | 8 | | | | 8 | | | |
| Pigment dispersion 6 (solid content) | | 6 | | | | 6 | | |
| Pigment dispersion 7 (solid content) | | | 8 | | | | 8 | |
| Pigment dispersion 8 (solid content) | | | | 6 | | | | 6 |
| Surfactant A expressed by Structural Formula (1) PF151N (solid content) | 1.00 | | | | 1.00 | 1.00 | 1.00 | |
| Surfactant B expressed by Structural Formula (2) EP7025 (solid content) | | 1.00 | 1.00 | 1.00 | | | | 1.00 |
| Ratio of B to A "B/A" (active ingredient) | — | — | — | — | — | — | — | — |
| Total amount of A and B (active ingredient) | 1 | 1 | 1 | 1 | 1 | 1 | 1 | 1 |

TABLE 5-5-continued

|  |  | Comparative Example 13 | | | | Comparative Example 14 | | | |
| --- | --- | --- | --- | --- | --- | --- | --- | --- | --- |
|  |  | Produc. Ex. 45 | Produc. Ex. 46 | Produc. Ex. 47 | Produc. Ex. 48 | Produc. Ex. 49 | Produc. Ex. 50 | Produc. Ex. 51 | Produc. Ex. 52 |
| Water soluble organic solvent | glycerin | 10 | 10 | 10 | 10 | 10 | 10 | 10 | 10 |
|  | 1,3-butanediol |  | 20 | 20 | 20 |  | 20 | 20 | 20 |
|  | 2-methyl-2,4-pentanediol | 20 |  |  |  | 20 |  |  |  |
| Penetrating agent | 2,2,4-trimethyl-1,3-pentanediol | 2.0 | 2.0 | 2.0 | 2.0 | 2.0 | 2.0 | 2.0 | 2.0 |
| Resin emulsion | acrylic silicone resin AP4710 (solid content) | 1.5 | 1.5 | 1.5 | 1.5 | 1.5 | 1.5 | 1.5 | 1.5 |
|  | urethane resin W-6061 (solid content) | 1.0 | 1.0 | 1.0 | 1.0 | 1.0 | 1.0 | 1.0 | 1.0 |
| Anti-foaming agent | KM-90 | 0.1 | 0.1 | 0.1 | 0.1 | 0.1 | 0.1 | 0.1 | 0.1 |
| Purified water |  | balance | balance | balance | balance | balance | balance | balance | balance |
| Total |  | 100 | 100 | 100 | 100 | 100 | 100 | 100 | 100 |
| Color bleeding |  |  |  | C |  |  |  | A |  |
| Ejection stability |  |  |  | C |  |  |  | C |  |

Note:
Produc. Ex. means Production Example.

Reference Signs List

| | |
| --- | --- |
| 1b | common liquid chamber |
| 2a | fluid resistance portion |
| 2b | pressurized fluid chamber |
| 2c | link port |
| 3a | nozzle |
| 3b | ink repellent layer (liquid repellent layer) |
| 5f | driving part |
| 5g | support part (non-driving part) |
| 6a | convex portion |
| 6b | diaphragm portion |
| 6c | ink inflow port |
| 10 | frame |
| 20 | channel plate |
| 30 | nozzle plate |
| 40 | base |
| 50 | laminated piezoelectric element |
| 60 | oscillation plate |
| 70 | adhesive layer |
| 131 | guide rod |
| 133 | carriage |
| 134 | inkjet head |
| 141 | conveying belt |
| 142 | recording paper |
| 157 | driving roller |
| 158 | driven roller |
| 200 | ink cartridge |
| 241 | ink bag |
| 242 | ink charging port |
| 243 | ink discharge port |
| 244 | cartridge case |

The invention claimed is:

1. An inkjet recording ink, comprising water and:
   a colorant;
   a surfactant A;
   a surfactant B; and
   a water soluble organic solvent,
   wherein:
   the surfactant A is expressed by any one of Structural Formula (1) and Structural Formula (2), and the surfactant B is expressed by Structural Formula (3):

Structural Formula (1)

$$R^1 \!\!\left(\!\!O\!-\!CH_2\!-\!\underset{\underset{CH_3}{|}}{\overset{\overset{OCH_2-Rf}{|}}{\underset{|}{C}}}\!-\!CH_2\!\right)_{\!\!n}\!\!O\!\!\left(\!CH_2\!-\right.$$

$$\left.-CH_2\!-\!O\!\right)_{\!\!m}\!\!\left(\!CH_2\!-\!\underset{\underset{CH_3}{|}}{\overset{\overset{OCH_2-Rf}{|}}{\underset{|}{C}}}\!-\!CH_2\!-\!O\!\right)_{\!\!p}\!\!R^1;$$

in Structural Formula (1):

$R^1$ represents hydrogen, an alkyl group, or an acyl group;

Rf represents $-CF_3$ or $-CF_2CF_3$; and m, n and p represent natural numbers;

Structural Formula (2)

$$MO_3S\!\!\left(\!\!O\!-\!CH_2\!\underset{\underset{CH_3}{|}}{\overset{\overset{O-CH_2Rf}{|}}{\underset{|}{C}}}\!CH_2\!\right)_{\!\!q}\!\!OSO_3M,$$

in Structural Formula (2):

M represents alkali metal, ammonium, phosphonium, or alkanolamine;

Rf represents $-CF_3$ or $-CF_2CF_3$; and q represents a natural number;

Structural Formula (3)

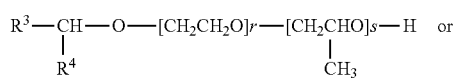

-continued

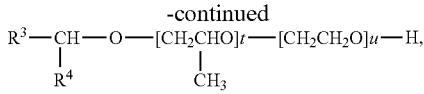

in Structural Formula (3):
$R^3$ and $R^4$ each represent hydrogen or an alkyl group; and
r, s, t and u represent natural numbers.

2. The inkjet recording ink according to claim 1, wherein:
the colorant is a dispersion obtained by a process comprising dispersing an organic pigment or a carbon black with a nonionic dispersant expressed by Structural Formula (4):

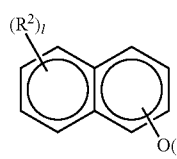

Structural Formula (4)

in Structural Formula (4),
$R^2$ represents an alkyl group having 1 to 20 carbon atoms, an aralkyl group having 1 to 20 carbon atoms, or an allyl group;
l represents an integer of 0 to 7; and
k represents an integer of 20 to 80.

3. The inkjet recording ink according to claim 1, wherein the colorant is a self-dispersible pigment, which is obtained by a process comprising forming a hydrophilic group on a surface of an organic pigment or a carbon black.

4. The inkjet recording ink according to claim 1, further comprising:
a resin emulsion.

5. An inkjet recording inkset, comprising:
a black inkjet recording ink comprising a black colorant; and
a color inkjet recording ink comprising a color colorant,
wherein the black inkjet recording ink and the color inkjet recording ink each further comprise an inkjet recording ink of claim 1; and
a ratio B/A of the surfactant B to the surfactant A in the black inkjet recording ink is larger than a ratio B/A of the surfactant B to the surfactant A in the color inkjet recording ink.

6. An inkjet recording method, comprising ejecting the inkjet recording ink of claim 1 with an inkjet recording apparatus equipped with an inkjet head having any one of an ink repellent layer comprising a fluorine silane coupling agent and an ink repellent layer comprising a silicone resin.

7. An inkjet recording method, comprising ejecting the inkjet recording inkset of claim 5 with an inkjet recording apparatus equipped with an inkjet head having any one of an ink repellent layer comprising a fluorine silane coupling agent and an ink repellent layer comprising a silicone resin.

8. The inkjet recording ink according to claim 1, comprising, as the surfactant A, the Structural Formula (1) wherein:
m represents a natural number from 10 to 30; and
n+p represents a natural number from 4 to 10.

9. The inkjet recording ink according to claim 1, comprising, as the surfactant A, the Structural Formula (2) wherein q represents a natural number from 4 to 10.

10. The inkjet recording ink according to claim 1, wherein, in the Structural Formula (3):
r, s, t and u represent natural number of 12 or less.

11. The inkjet recording ink according to claim 1, wherein, in the Structural Formula (3):
r represents a natural number from 5 to 9;
s represents a natural number from 3 to 5;
t represents 2; and
u represents a natural number from 7 to 12.

* * * * *